United States Patent [19]

Morooka et al.

[11] Patent Number: 6,079,483
[45] Date of Patent: Jun. 27, 2000

[54] TEMPERATURE/HUMIDITY CONTROLLER FOR USE IN AN AIR CONDITIONER AND A RECORDING MEDIUM STORING TEMPERATURE/HUMIDITY CONTROL PROGRAMS USED THEREFOR

[75] Inventors: Hideaki Morooka; Yoshio Suzuki; Naoki Mawatari; Muneo Ueda, all of Yokohama, Japan

[73] Assignee: Trinity Industrial Corporation, Toyota, Japan

[21] Appl. No.: 09/274,246

[22] Filed: Mar. 23, 1999

[51] Int. Cl.[7] .............................. F25B 29/00; F24F 3/044; F24F 3/14; F24F 11/02

[52] U.S. Cl. .......................... 165/11.1; 165/206; 165/224; 165/228; 165/229; 165/230; 236/44 C; 62/176.6; 62/176.4; 62/173; 62/90; 62/91; 62/92

[58] Field of Search .................................... 165/11.1, 206, 165/224, 228, 229, 230; 236/44 C; 62/176.6, 176.4, 92, 91, 90, 173

[56] References Cited

U.S. PATENT DOCUMENTS

| | | | |
|---|---|---|---|
| 3,444,921 | 5/1969 | Carapico, Jr. | 165/229 |
| 3,478,817 | 11/1969 | Shaw | 165/229 |
| 4,542,851 | 9/1985 | Itou | 236/44 C |
| 4,616,777 | 10/1986 | Fisher et al. | 236/44 C |
| 4,627,568 | 12/1986 | Lortie et al. | 165/230 |
| 4,750,545 | 6/1988 | Hile et al. | 165/228 |
| 5,632,333 | 5/1997 | Imamura et al. | 165/229 |
| 5,984,002 | 11/1999 | Kido et al. | 165/230 |

FOREIGN PATENT DOCUMENTS

| | | | |
|---|---|---|---|
| 60-181537 | 9/1985 | Japan | 165/228 |
| 1-181112 | 7/1989 | Japan . | |
| 07174360 | 7/1995 | Japan . | |
| 09089350 | 4/1997 | Japan . | |

*Primary Examiner*—John K. Ford
*Attorney, Agent, or Firm*—Pillsbury Madison & Sutro LLP

[57] ABSTRACT

In a main controller for use in an air conditioner for controlling temperature/humidity of an intaken outside air, a controlling line setter (18) sets each of control lines ($J_1$–$J_5$) on a psychrometric chart table (13), in which an aimed temperature/humidity line (Lo) is formed by connecting an upper limit state point (Ps) and a lower limit state point (Pw) of condition air from each of the outside air state points ($G_1$–$G_5$) to the aimed temperature/humidity line (Lo). The controlling line ($J_1$–$J_5$) is formed by connecting necessary lines selected from a main heating line ($H_L$) showing the heating operation of a main heater (H), an adiabatic humidifying line ($W_L$) showing the humidifying operation of an adiabatic humidifying device (W), a cooling line ($C_L$) showing the cooling operation of a cooler (C) and an auxiliary heating line ($RH_L$) showing the heating operation of the auxiliary heater (RH), and the end point temperature for each of the lines is set as the aimed exit temperature for each of the temperature/humidity adjusters (4, 4) and each of the temperature/humidity adjusters (4—4) is individually put to feedback control. Temperature/humidity control can be conducted accurately and at a good response, and energy can be saved and the running cost can be reduced.

5 Claims, 11 Drawing Sheets

F I G. 7(a)
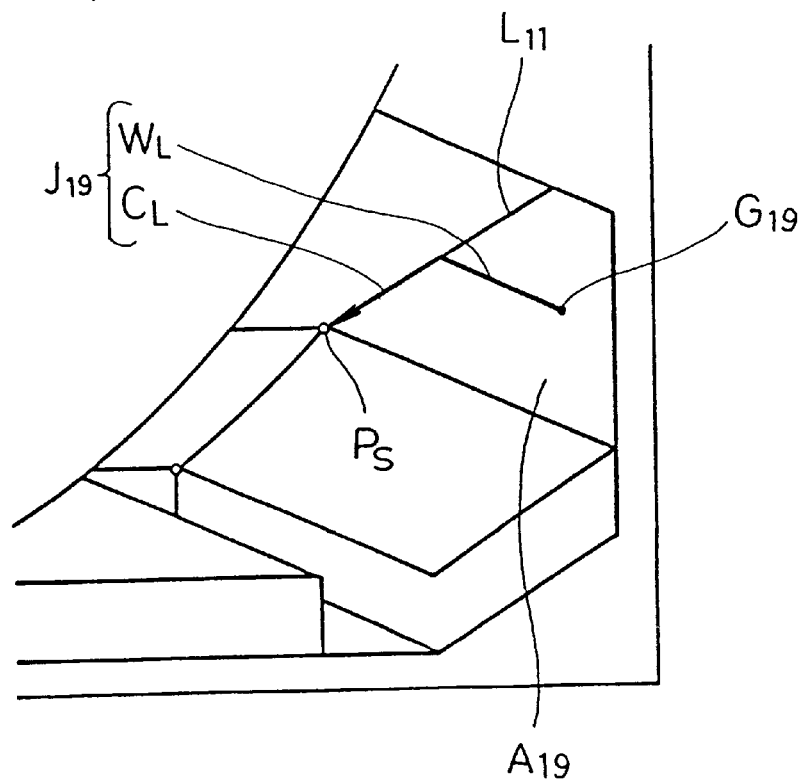
F I G. 7(b)
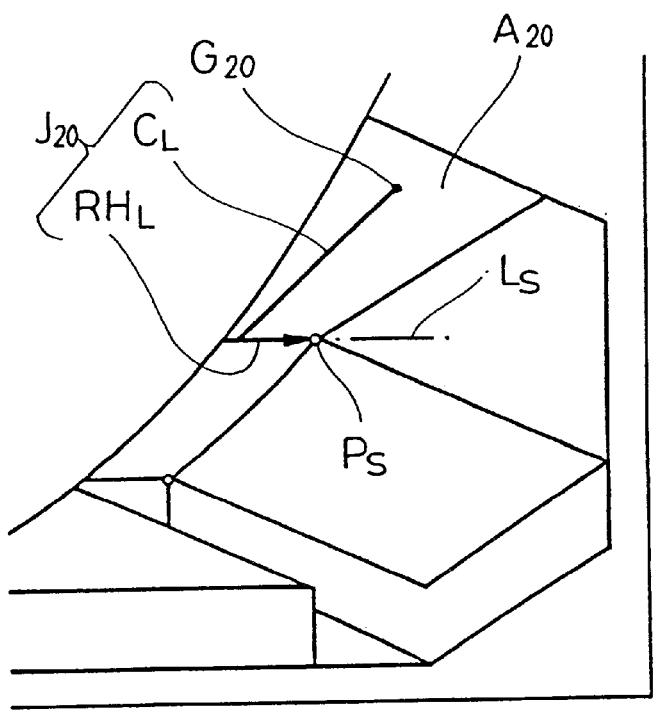

TEMPERATURE/HUMIDITY CONTROLLER FOR USE IN AN AIR CONDITIONER AND A RECORDING MEDIUM STORING TEMPERATURE/HUMIDITY CONTROL PROGRAMS USED THEREFOR

BACKGROUND OF THE INVENTION

1. Field of the Invention

The present invention concerns a temperature/humidity controller for use in an air conditioner for controlling temperature/humidity of the air conditioner for supplying conditioned air controlled to predetermined temperature/humidity, as well as a recording medium storing temperature/humidity control programs used therefor. More particularly, it relates to a temperature/humidity controller for use in an air conditioner suitable to supply of conditioned air to a coating booth or the like intended to conduct coating under an identical condition while maintaining temperature/humidity at a constant state.

2. Statement of the Related Art

FIG. 8 shows an existent air conditioner 1 for controlling an intaken outside air to predetermined temperature/humidity, in which an outside air intake port 2 is formed to one end and an conditioned air supply port 3 is formed at the other end.

For controlling temperature/humidity of outside air, the air conditioner 1 has temperature/humidity adjusting devices (4, 4, - - - ) including, for example:

- a main heater H of a variable heating capacity such as a burner usually referred as a preheater,
- an adiabatic humidifier W of a variable humidifying capacity such as a packed bed type air-water contact device or an air washer,
- a cooler C of a variable cooling capacity such as cooling coils,
- an auxiliary heater RH capable of finely controlling heating capacity usually referred to as a reheater and
- an isothermal humidifier DS for conducting isothermal humidification such as a steam injection pipe in this order, along an air flow path from the exit air intake port 2 to the conditioned air supply port 3 in this order.

A roll filter RF is interposed between the main heater H and the adiabatic humidifier W for removing dusts in air. A blower 5 for delivery of conditioned air is disposed to the conditioned air supply port 3.

A temperature sensor $T_2$ disposed to the exit of the adiabatic humidifier W and a temperature/humidity sensor $TH_2$ disposed to the conditioned air supply port 3 are connected to the controller 40. The temperature of air after passing through the main heater H and the adiabatic humidifier W is detected by the temperature sensor $T_2$, and the temperature/humidity of the conditioned air is detected by the temperature/humidity sensor $TH_2$.

The adiabatic humidifier W is operated at a full power such that air after passing the device reaches 100% relative humidity. The controller 40 conducts feedback control for the capacity of the main heater H based on the detection signal from the temperature sensor $T_2$, and the cooling/heating/humidifying capacity of the cooler C, the auxiliary heater RH and the isothermal humidifier DS based on the detection signal from the temperature/humidity sensor $TH_2$.

For instance, if the temperature detected by the temperature sensor $T_2$ is higher than a predetermined allowable temperature range, the amount of heat supplied from the main heater H is decreased. On the contrary, if the temperature is lower than the allowable temperature range, the amount of heat supplied from the main heater H is increased to elevate the temperature to a level within the allowable temperature range.

Since the adiabatic humidifier W is operated at the full power, air passing therethrough is humidified to a saturated steam pressure line at 100% relative humidity, then cooled to dehumidify to a predetermined absolute humidity by the cooler C based on the result of detection by the temperature/humidity sensor $TH_2$, and then heated to a predetermined temperature by the auxiliary heater RH, or optionally humidified by isothermal humidification by the isothermal humidifier DS as required, by which the outside air intaken to the air conditioner 1 is controlled for temperature/humidity to finally obtain a conditioned air of a desired temperature/humidity.

In the prior art, when temperature/humidity of the conditioned air is controlled to a predetermined state point on the temperature/humidity line Lo shown in FIG. 9, since air passing through the adiabatic humidifier W reaches the saturated steam pressure line LH exceeding the temperature/humidity line Lo, cooling operation is applied by the cooler C for dehumidification.

Further, even if the air is dehumidified by the cooler C to reach the aimed humidity, since the temperature goes lower than the aimed temperature, it has to be heated further by the auxiliary heater RH.

If the temperature of air after passing through the auxiliary heater RH exceeds the temperature/humidity line Lo, the relative humidity is lowered and, therefore, isothermal humidification is applied by the isothermal humidifier DS. Thus, troublesome and complicated control has been necessary.

As described above, since air conditioning in the prior art requires control process of heating (main heater H)→cooling (adiabatic humidifier W)→heating (auxiliary heater RH), or control process of humidification (adiabatic humidifier W)→dehumidification (cooler C)→humidification (isothermal humidifier DS), this results in problems of increasing energy loss and running cost due to the wasteful control process.

If the capacity for each of the main heater H, adiabatic humidifier W, the cooler C, the auxiliary heater RH and the isothermal humidifier DS is put to feedback control individually based on the exit temperature and the exit humidity for each of them, control may be conducted with relatively less wasteful loss.

FIG. 10 shows an air conditioner 1 comprising a capacity setter 41 conducting such control. The capacity setter 41 comprises capacity controllers 42–46 for conducting feedback control of the heating capacity/humidifying capacity/cooling capacity of a main heater H, an adiabatic humidifier W, a cooler C, an auxiliary heater RH and a isothermal humidifier DS individually.

At the input of the capacity controllers 42–46, are connected temperature sensors $T_1$–$T_4$ for measuring the exit temperature of the main heater H, the adiabatic humidifier W, the cooler C and the auxiliary heater RH, and a temperature/humidity sensor $TH_2$ for detecting temperature/humidity of conditioned air at the conditioned air supply port 3. The controllers 42–46 are connected at the output thereof to the main heater H, the adiabatic humidifier W, the cooler C, the auxiliary heater RH and the isothermal humidifier DS, respectively.

In this improved prior art system, since the capacity for each of the devices is controlled such that the exit temperature for each of them detected by the temperature sensors $T_1$–$T_4$ is identical with a predetermined aimed exit temperature, and the exit humidity of the isothermal humidifier DS is finely controlled based on the temperature detected by the temperature/humidity sensor $TH_2$, a conditioned air controlled to predetermined temperature/humidity can be obtained.

However, it is not easy to actually determine the exit temperature of each of the temperature/humidity adjusting devices 4, 4, - - - to a specified level at the conditioned air supply port 3 in order to attain predetermined aimed temperature/humidity for the conditioned air. Even if the aimed temperature/humidity is set constant, the exit temperature for each of the temperature/humidity adjusting devices 4, 4, - - - changes if the temperature/humidity of the outside air fluctuate.

For example, in a psychrometric chart shown in FIG. 11, when the temperature and the absolute humidity at the outside air state point $X_1$ are lower than those at the aimed state point Po for the conditioned air, an operation of heating an outside air by the main heater H and then adiabatically humidifying the heated air by the adiabatic humidifier W is applied, in which the aimed exit temperature for the main heater H is set to $t_1$.

In this case, if the temperature of the outside air rises to reach the outside air state point $X_2$, the aimed exit temperature of the main heater H is lowered to $t_2$. On the contrary, if the humidity is lowered to reach the outside air state point $X_3$, the aimed exit temperature of the main heater H is elevated to $t_3$.

By the way, even when the temperature of the outside air is elevated or lowered, if the absolute humidity is equal with that at the outside air state point $X_1$, the aimed exit temperature $t_1$ for the main heater H does not change.

On the other hand, when the temperature for the outside air statement point $X_5$ is higher than that at the aimed state point Po for the conditioned air and the absolute humidity is lower than that at the aimed state point Po for the conditioned air, an operation of adiabatically humidifying air by the adiabatic humidifier W and then cooling air by the cooler C is applied, in which the aimed exit temperature of the adiabatic humidifier W is at $t_5$.

In this case, when the temperature of the outside air elevates with no change for the absolute humidity to the outside air state point $X_6$, the exit temperature of the adiabatic humidifier W elevates to $t_6$. On the other hand, if the temperature is lowered to the outside air state point $X_7$, the exit temperature of the adiabatic humidifier W is lowered to $t_7$.

As described above, since the aimed exit temperature for each of the devices changes currently depending on the fluctuation of the temperature/humidity of the outside air and since a relation between the fluctuation of the temperature/humidity of the outside air and the aimed exit temperature is complicate, it is difficult to exactly set the aimed exit temperature by each of the capacity controllers 42–46, resulting in a worry of making the control instable.

In addition, since the capacity to operate each of the temperature/humidity adjusting devices 4, 4, - - - provided to the air conditioner 1 is different depending on the type and the capacity of each of them, so that no stable and efficient control can be conducted by merely controlling each of the temperature/humidity adjusting devices 4, 4, - - - individually.

OBJECT OF THE INVENTION

It is, accordingly, an object of the present invention to provide air conditioning control stably and at good response under optimum conditions for an air conditioner, upon conducting feedback control for each of the temperature/humidity adjusting devices that control an outside air to predetermined temperature/humidity, and enable to save energy and reduce running cost.

SUMMARY OF THE INVENTION

For attaining the foregoing object, the present invention provides a temperature/humidity controller used for controlling temperature/humidity of an air conditioner (1) in which
at least one of temperature/humidity adjusting devices(4, 4, - - - ) including a main heater (H), an adiabatic humidifier (W), a cooler (C) and an auxiliary heater (RH) for controlling temperature/humidity of an intaken outside air are arranged in this order along an air flow path, and further comprising;
capacity controllers ($Y_1$–$Y_4$) each conducting feedback control for the capacity of each of the temperature/humidity adjusting devices (4, 4, - - - ) such that the exit temperature or the exit humidity of each of the temperature/humidity adjusting devices (4, 4, - - - ) is identical with the aimed exit temperature or aimed exit humidity, wherein
the temperature/humidity controller comprises a main controller (11) having a temperature/humidity sensor ($TH_1$) for detecting temperature/humidity of the outside air connected to the input thereof and the capacity controllers ($Y_1$–$Y_4$) connected to the output thereof, in which
the main controller (11) comprises:
a psychrometric chart table (13) previously storing a psychrometric chart,
an aimed temperature/humidity line setter (14) for setting, on the psychrometric chart table (13), an aimed temperature/humidity line (Lo) formed by connecting an upper state point (Ps) determined by an upper limit temperature and an upper limit humidity and a lower limit state point (Pw) determined by a lower limit temperature and a lower limit humidity of a conditioned air,
an outside air state point setter (16) for setting each of outside air state points ($G_1$–$G_5$) based on the temperature/humidity of an outside air detected by the temperature/humidity sensor ($TH_1$) on the psychrometric chart table (13),
a controlling line setter (18) for setting each of controlling lines ($J_1$–$J_5$) formed by sequentially connecting necessary lines selected from a main heating line ($H_L$) progressing along an equal absolute humidity line in the heating direction on the psychrometric chart, an adiabatic humidifying line ($W_L$) progressing along an equal enthalpy line in the humidifying direction on the psychrometric chart, a cooling line ($C_L$) progressing toward a cooling temperature (Tc) set lower than the dew point for the upper limit state point (Ps) on the psychrometric chart and an auxiliary heating line ($RH_L$) progressing along the equal absolute humidity line in the heating direction on the psychrometric chart in this order, from the outside air state point ($G_1$–$G_5$) to a point on the aimed temperature/humidity line (Lo), in accordance with the temperature/humidity adjusting device (4, 4, - - - ) provided to the air conditioner (1), and
an aimed exit temperature setter (20) for outputting the temperature for the end point of each of the main heating line ($H_L$), the adiabatic humidifying line ($W_L$), the cooling line ($C_L$) and the auxiliary heating line ($RH_L$) as the aimed exit temperature for each of the main heater (1), the adiabatic humidifier (W), the cooler (C) and the auxiliary heater (RH) provided to the air conditioner (1) in accordance with each of the controlling lines ($J_1$–$J_5$) set by the controlling line setter (18) to each of the capacity controllers ($Y_1$–$Y_4$).

According to the present invention, an aimed temperature/humidity line formed by connecting an upper limit state point defined by an upper limit temperature and an upper limit humidity of a conditioned air and a lower limit state point defined by a lower limit temperature and a lower limit humidity of conditioned air is set on a psychrometric chart, on which an outside air state point defined by temperature/humidity of an outside air is set.

Then, a controlling line is set, from the outside air state point to a state point on the aimed temperature/humidity line (for example, to the nearest state point), by sequentially connecting necessary lines selected from:

a main heating line progressing along an equal absolute humidity line in the heating direction on the psychrometric chart (horizontally to the right), an adiabatic humidifying line progressing along an equal enthalpy line in the heating direction on the psychrometric chart (obliquely upwardly to the left), a cooling line progressing toward a cooling temperature set to lower than the dew point for upper limit state point on the psychrometric chart (obliquely downwardly to the left) and an auxiliary heating line progressing along the equal absolute humidity line in the heating direction on the psychrometric chart (horizontally to the right), in this order.

Then, based on the controlling line, the end point temperature for each of the main heating line, the adiabatic humidifying line, the cooling line and the auxiliary heating line is set as the aimed exit temperature for each of the main heater, the adiabatic humidifier, the cooler and the auxiliary heater.

Accordingly, if the aimed exit temperature is set to each of the capacity controllers of the existent air conditioner comprising the main heater, the adiabatic humidifier, the cooler and the auxiliary heater as the temperature/humidity adjusting devices, the capacity of each of the temperature/humidity adjusting devices is put to feedback control independently of each other such that each of the exit temperatures is identical with the aimed exit temperature in each of the capacity controllers.

In this case, since the aimed exit temperature for each of them is set to an optimum value as the process temperature for controlling the outside air to predetermined temperature/humidity based on the controlling line and since the temperature at each exit is monitored and feedback control is conducted on each of the temperature/humidity adjusting devices, control can be conducted stably and at a good response, contributing to energy saving and reduction of running cost.

EXPLANATION FOR DRAWINGS

Preferred embodiments of the present invention will be explained specifically with reference to the accompanying drawings, wherein FIG. 1 is a block diagram of a temperature/humidity controller for an air conditioner according to the present invention;

FIG. 5 to FIG. 7 are psychrometric charts showing control operations;

FIG. 11 is a psychrometric chart showing control operations thereof in which:

those portions in common with FIG. 1 to FIG. 7 and FIG. 8 to FIG. 10 carry the same reference numerals for which duplicate explanation will be omitted.

FIRST EMBODIMENT

Figure 1:
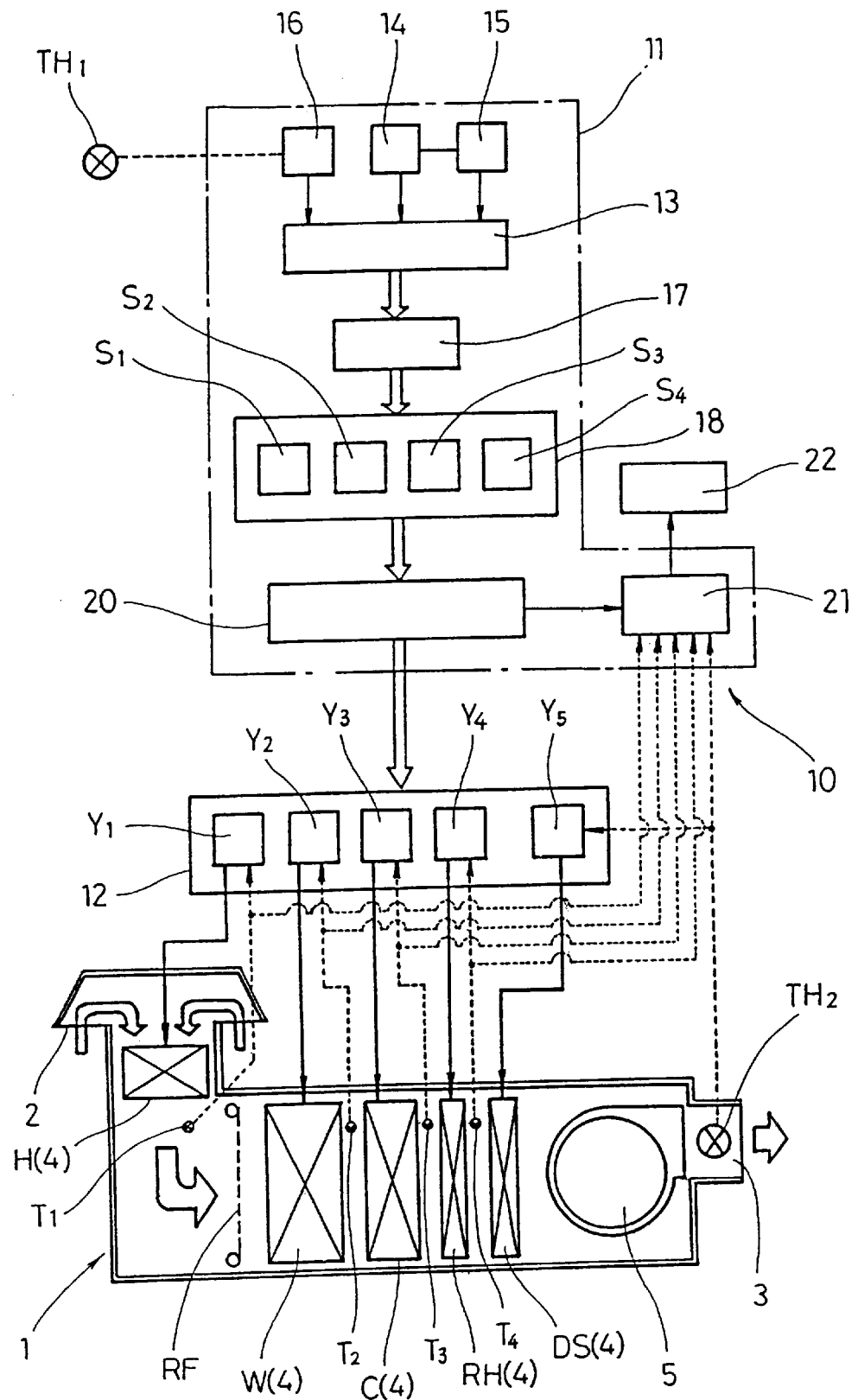

In a temperature/humidity controller 10 for an air conditioner shown in FIG. 1, a temperature/humidity sensor $TH_1$ for detecting temperature/humidity of outside air is connected to the input of a main controller 11, and a capacity setter 12 for conducting feedback control for the capacity of a main heater H, an adiabatic humidifier W, a cooler C, an auxiliary heater RH and an isothermal humidifier DS of the conditioner 1 is connected to the output of the main controller 11.

The main controller 11 calculates an aimed exit humidity of each of temperature/humidity adjusting devices 4, 4, - - - for conducting heating/humidification/cooling based on the temperature/humidity of the outside air detected by the temperature/humidity sensor $TH_1$.

The capacity setter 12 has capacity controllers $Y_1$–$Y_5$ for controlling the capacity of the temperature/humidity adjusting devices 4, 4, - - - in which temperature sensors $T_1$–$T_4$, and a temperature/humidity sensor $TH_2$ disposed to the exit for the temperature/humidity adjusting devices 4, 4, - - - are connected respectively to the input for each of them, and each of the temperature/humidity adjusting devices 4, 4 - - - is connects to the output of the capacity setter 12. The setter 12 conducts feedback control for the capacity of each of the temperature/humidity adjusting devices 4, 4, - - - such that each of the detected exit temperature/exit humidity is identical with each of the aimed exit temperature/aimed exit humidity supplied as data from the main controller 11.

The main controller 11 comprises the following components:

a psychrometric chart table 13 previously storing a psychrometric chart, an aimed temperature/humidity line setter 14 for setting an aimed temperature/humidity line Lo representing temperature/humidity of conditioned air to the psychrometric chart table 13, a control area setter 15 for dividing the psychrometric chart into a plurality of control areas $A_1$–$A_4$ based on the aimed temperature/humidity control line Lo, an outside air state point setter 16 for setting each of outside air state points $G_1$–$G_5$ based on the temperature/humidity of outside air detected by the temperature/humidity sensor $TH_1$ to the psychrometric chart table 13, a control area judging device 17 for judging one of control areas $A_1$–$A_4$ which includes an outside air set point ($G_1$–$G_5$), a controlling line setter 18 for setting each of controlling lines $J_1$–$J_5$ representing the change of temperature/humidity of outside air based on each of the outside air state points $G_1$–$G_5$ and the aimed temperature/humidity line Lo, an aimed exit temperature setter 20 for calculating the aimed exit temperature for each of the main heater H, the adiabatic humidifier W, the cooler C, the auxiliary heater RH and the isothermal humidifier DS based on each of the controlling lines $J_1$–$J_5$ set by the controlling line setter 18, and outputting the same to the capacity setter 12, and an abnormality detector 21 for outputting an alarm signal when an abnormality is caused to any one of the temperature/humidifier adjusting devices 4, 4, - - - -.

In the aimed temperature/humidity line setter 14, when an upper limit state point Ps determined by an upper limit temperature and an upper limit humidity of conditioned air and a lower limit state point Pw determined by a lower limit temperature and a lower limit humidity of conditioned air are inputted, a line connecting the state points is automatically set as the aimed temperature/humidity line Lo.

Each of the upper limit state point Ps and the lower limit state point Pw is determined so as to be equal with the atmosphere in a coating booth in the summer season and the winter season. For example, the upper limit state point Ps is set to a temperature of 28° C., while the lower limit state point Pw is set to a temperature of 20° C. with the relative humidity being defined as 75% in each of the cases.

Based on the aimed temperature/humidity line Lo, the area setter 15 sets the following lines on the psychrometric chart table 13:

an upper limit enthalpy line Es: a line with enthalpy equal to that at the upper limit state point Ps and extending toward a higher temperature region, an upper limit absolute humidity line Ls: a line with absolute humidity equal to that at the upper limit state point Ps and extending toward a lower temperature region.

a lower limit enthalpy line Ew: a line with enthalpy equal to that at the lower limit state point Pw and extending toward a higher temperature region, and a lower limit absolute humidity line Lw: a line with absolute humidity equal to that at the lower limit state point Pw and extending toward the low temperature region.

Then, the control area setter 15 divides the psychrometric chart into the following four areas $A_1$–$A_4$, based on the above-mentioned setting, and sets each of the areas in the psychrometric chart table 13:

a low temperature control area $A_1$: an area in a low temperature region defined by the lower limit enthalpy line Ew and the lower limit absolute humidity line Lw, a middle temperature/low humidity control area $A_2$: an area in a lower temperature region defined by the upper limit enthalpy line Es, the lower limit enthalpy line Ew and the aimed temperature/humidity line Lo, a middle temperature/high humidity control area $A_3$: an area defined by the upper limit absolute humidity line Ls, the lower limit absolute humidity line Lw and the aimed temperature/humidity line Lo, and a high temperature control area $A_4$: an area in a higher temperature region defined by the upper limit enthalpy line Es and the upper limit absolute humidity line Ls.

The controlling line setter 18 sets each of controlling lines $J_1$–$J_5$ on the psychrometric chart, from each of the outside air state points $G_1$–$G_5$ to the nearest state point on the aimed temperature/humidity line Lo, by connecting necessary lines selected from the following lines in the order of:

Main Heating Line $H_L$:
a line progressing along the equal absolute humidity line in the heating direction (horizontally to the right), Adiabatic Humidifying Line $W_L$:
a line progressing along the equal enthalpy line in the humidifying direction (upwardly and obliquely to the left), Cooling Line $C_L$:
a line progressing toward the cooling temperature Tc set to lower than the dew point for the upper limit state point Ps (downwardly obliquely to the left), Auxiliary Heating Line $RH_L$:
1a line progressing along the equal absolute humidity line in the heating direction (horizontally to the right).

This embodiment comprises a low temperature control process setter $S_1$, a middle temperature/low humidity control process setter $S_2$, a middle temperature/high humidity control process setter $S_3$ and a high temperature control process setter $S_4$ previously storing control processes in accordance with each of the control areas $A_1$–$A_4$, which includes each of the outside air state points $G_1$–$G_5$ respectively and each of the setters is adapted to determine control processes for each of the control areas $A_1$–$A_4$.

In the low temperature control area $A_1$, since the enthalpy and the absolute humidity at the outside air state point $G_1$ are lower compared with the lower limit state point Pw, heating process is applied to increase the enthalpy and air is humidified by an adiabatic humidifying operation.

Accordingly, the control process setter $S_1$ sets the controlling line $J_1$ which is prepared by sequentially connecting the main heating line $H_L$ progressing, from the outside air state point $G_1$ to the lower limit state point Ew, along the equal absolute humidity line in the heating direction to the lower limit enthalpy line Ew on the psychrometric chart, and the diabatic humidifying line $W_L$ progressing along the equal enthalpy line in the humidifying direction to the lower limit state point on the psychrometric chart in this order.

In the middle temperature/humidity control area $A_2$, since the outside air state point $G_2$ has enthalpy equal with and relative humidity lower than at any state point on the aimed temperature/humidity line Lo, air is humidified in an equal enthalpy state by the adiabatic humidifying operation.

Accordingly, the control process setter $S_2$ sets, as the controlling line $J_2$, the adiabatic humidity line $W_L$ that progresses along the equal enthalpy line in the humidifying direction from the outside air state point $G_2$ to the aimed temperature/humidity line Lo on the psychrometric chart.

In the middle temperature/high humidity control area $A_3$, since the outside air state point $G_3$ has absolute humidity equal with and temperature lower than that at any of the state points on the aimed temperature/humidity line Lo, heating operation is conducted. Since the temperature difference relative to the state point on the aimed temperature/humidity Lo is small in the area $A_3$, it is difficult to control temperature by the main heater H of large heating capacity, so that the auxiliary heater RH capable of finely controlling the heating capacity is used.

Accordingly, the control process setter $S_3$ sets, as the controlling line $J_3$, the auxiliary heating line $RH_L$ that progresses along the equal absolute humidity line in the heating direction from the outside air state point $G_3$ to the aimed temperature/humidity line Lo on the psychrometric chart.

In the high temperature control area $A_4$, the outside air state point $G_4$ or $G_5$ has higher enthalpy or higher absolute humidity than at the upper limit state point Ps. Accordingly, it is not necessary to increase enthalpy by heating operation, though it is necessary to conduct cooling operation.

Then, different control operations are necessary such that air is previously humidified while forecasting the humidity to be removed by the cooling operation in a case of the outside air state point $G_4$ in which the enthalpy is higher and the absolute humidity is lower than at the upper limit state point Ps, or humidity is removed by the cooling operation and then heated by the heating operation by so much for overcooling when the absolute humidity is sufficiently higher than the upper limit state point Ps as in the case of the outside air state point $G_5$.

The high temperature control area $A_4$ is divided by a boundary line Wc, which passes through the cooling state point Pc with 100% relative humidity at the cooling temperature Tc of the cooler C and the upper limit state point Ps, into a lower humidity area $d_1$ in a lower humidity region than the boundary line Wc and a higher humidity area $d_2$ in a higher humidity region than the boundary line. When the outside air state point $G_4$ is in the lower humidity area $d_1$, the relative humidity is increased by the adiabatic humidifying operation and then humidity is removed under cooling by the cooling operation. When the outside air state point $G_5$ is in the higher humidity area $d_2$, air is dehumidified and cooled by the cooling operation and then heated by the heating operation.

Accordingly, control processes when the outside air state point $G_4$ is in the lower humidity area $d_1$ and control processes when the outside air state point $G_5$ is in the higher humidity area $d_2$ are set respectively to the control process setter $S_4$.

Then, when the outside air state point $G_4$ is in the lower humidity area $d_1$, the control process setter $S_4$ sets the controlling line $J_4$ formed by sequentially connecting the adiabatic humidifying line $W_L$ progressing along the equal enthalpy line to the boundary line $W_c$ in the humidifying direction from the outside air state point to the upper limit state point Ps on the psychrometric chart, and the cooling line $C_L$ progressing along the boundary line $W_c$ in the cooling direction to the upper limit state point Ps in this order.

Further, when the outside air state point $G_5$ is in the higher humidity area $d_2$, the control process setter $S_4$ sets the controlling line $J_5$ formed by sequentially connecting the cooling line $C_L$ progressing toward the cooling state point Pc with 100% relative humidity at the cooling temperature Tc of the cooler C to the limit absolute temperature line Ls on the psychrometric chart and the auxiliary heating line $RH_L$ progressing along the upper limit absolute humidity line Ls in the heating direction to the upper limit absolute temperature line Ls on the psychrometric chart in this order.

Then, when each of the controlling lines $J_1$–$J_5$ is set in this way by the controlling line setter 18, the aimed exit temperature setter 20 sets the aimed exit temperature for each of the main heater H, adiabatic humidifier W, the cooler C and the auxiliary heater RH based on the setting of the controlling lines.

In this case, in each of the controlling lines $J_1$–$J_5$, the end point temperature of the main heating line $H_L$ is the aimed exit temperature for the main heater H, the end point temperature of the adiabatic humidity line $W_L$ is the aimed exit temperature for the adiabatic humidifier W, the end point temperature of the cooling line $C_L$ is the aimed exit temperature for the cooler C and the end point temperature of the auxiliary heating line $RH_L$ is the aimed exit temperature for the auxiliary heater RH.

Then, each of the aimed exit temperatures thus set is outputted to each of the capacity controllers $Y_1$–$Y_5$ of the capacity setter 12, and each of the capacity controllers $Y_1$–$Y_5$ conducts feedback control for the capacity such that the exit temperature detected by each of the temperature sensors $T_1$–$T_4$ is identical with each of the aimed exit temperatures.

The aimed exit temperature setter 20 and each of the temperature sensors $T_1$–$T_4$ are connected to the input and an alarm device 22 is connected to the output of the abnormality detector 21.

The abnormality detector 21 calculates a difference between the exit temperature for each of the temperature/humidity adjusting devices 4, 4, - - - detected by each of the temperature sensors $T_1$–$T_4$ and each of the aimed exit temperatures set by the aimed exit temperature setter 20. If the difference is not decreased to less than a level within an allowable tolerance even after the elapse of a predetermined period of time, the detector judges the occurrence of abnormality in any of the temperature/humidity adjusting devices 4, 4, - - - and outputs an alarm signal to the alarm device 22.

When the alarm signal is inputted, the alarm device 22 generates an alarming sound and lights up a warning lamp for informing the occurrence of abnormality to an operator and, further, lights up a monitor lamp indicating the abnormal state of the temperature/humidity adjusting devices 4, 4, - - - .

Operation of the First Embodiment

The constitution of the first embodiment of the present invention has been described above and the operation of this embodiment will be explained next.

At first, when the upper limit state point Ps for the atmospheric temperature at 28° C. and relative humidity at 75% as a coating booth atmosphere in the summer season, and the lower limit state point Pw for the atmospheric temperature at 20° C. and the relative humidity at 75% as the coating booth atmosphere in the winter season are set on the psychrometric chart recorded in the psychrometric chart table 13, the aimed temperature/humidity line setter 14 sets an aimed temperature/humidity line Lo formed by connecting the upper limit state point Ps and the lower limit state point Pw.

Then, when the aimed temperature/humidity line Lo is set, the control area setter 15 sets the following four area:

a low temperature control area $A_1$ for conducting control mainly in the winter season, a low temperature/low humidity control area $A_2$ for conducting control mainly in the spring/autumn season at low humidity, a middle temperature/high humidity control area $A_3$ for conducting control mainly in the spring/autumn season at high humidity, and a high temperature control area $A_4$ for conducting control mainly in the summer season.

The control areas $A_1$–$A_4$ are partitioned by an upper limit enthalpy line Es with enthalpy equal to that at the upper limit state point Ps and extending from the upper limit state point Ps toward a higher temperature region, an upper limit absolute humidity line Ls with absolute humidity equal to that at the upper limit state point Ps and extending from the upper limit state point Ps toward a lower temperature region, a lower limit enthalpy line Ew with enthalpy equal to that at the lower limit state point Pw and extending from the lower limit state point Pw toward a higher temperature region, and a lower limit absolute humidity line Lw with absolute humidity equal to that at the lower limit state point Pw and extending from the lower limit state point Pw toward a lower temperature region.

The high temperature control area $A_4$ is divided by a boundary line Wc, which passes through the cooling state point Pc with 100% relative humidity at the cooling temperature Tc of the cooler C and the upper limit state point Ps, into a lower humidity area $d_1$ in a lower humidity region and a higher humidity area $d_2$ in a higher humidity region, with respect to the boundary line Wc.

When the air conditioner 1 conducts temperature/humidity control, the temperature/humidity sensor $TH_1$ at first detects temperature/humidity of an outside air, and the outside air state point setter 16 sets each of the outside air state points $G_1$–$G_5$ on the psychrometric chart based on the result of the detection.

In the winter season, the outside air set point $G_1$ is often included in the lower temperature control area $A_1$. In this case, the control process setter $S_1$ sets the controlling line $J_1$ formed by sequentially connecting the main heating line $H_L$ progressing from the outside air state point $G_1$ to the lower limit state point Pw along the equal absolute humidity line $W_L$ in the heating direction on the psychrometric chart and the adiabatic humidifying line $W_L$ progressing along the equal enthalpy line in the humidifying direction on the psychrometric chart in this order.

Then, the aimed exit temperature setter 20 sets the temperature at the end point $B_1$ (crossing point between the main heating line $H_L$ and the lower limit enthalpy line Ew) of the main heating line $H_L$ in the controlling line $J_1$ as the aimed exit temperature of the main heater H and sets the temperature for the end point of the adiabatic humidifying line $W_L$ (lower limit state point Pw) as the aimed exit temperature of the adiabatic humidifier W, and outputs the aimed exit temperatures to the capacity controllers $Y_1$ and $Y_2$ for the main heater H and the adiabatic humidifier W respectively.

At first, the main heater capacity controller $Y_1$ conducts feedback control for the heating capacity such that the exit temperature of the main heater H detected by the temperature sensor $T_1$ is identical with the temperature for the end point $B_1$ of the main heating line $H_L$. Then the humidifying capacity controller $Y_2$ conducts feedback control for the humidifying capacity such that the exit temperature of the adiabatic humidifier W detected by the temperature sensor $T_2$ is identical with the temperature for the end point of the adiabatic humidifying line $W_L$ (lower limit state point Pw), by which the outside air state point $G_1$ progresses along the controlling line $J_1$ to reach the lower limit state point Pw.

In this case, the cooler C is kept not operated, while the auxiliary heater RH and the isothermal humidifier DS are operated in an idling state with the minimum heating capacity and the minimum humidifying capacity for the fine control of temperature/humidity in accordance with the result of detection by the temperature/humidity sensor $TH_2$.

Further, in the spring/autumn season at low relative humidity, the outside air state point $G_2$ is often included in the middle temperature/low humidity control area $A_2$. In this case, the control process setter $S_2$ sets the controlling line $J_2$ by the adiabatic humidifying line $W_L$ per se that progresses from the outside air state point $G_2$ to the aimed temperature/humidity line Lo along the direction of the equal enthalpy line in the humidifying direction (upwardly obliquely to the left) on the psychrometric chart.

Then, the aimed exit temperature setter 20 sets the temperature for the end point $B_2$ (state point on the aimed temperature/humidity line Lo) of the adiabatic humidifying line $W_L$ in the controlling line $J_2$ and outputs the set value to the humidifying capacity controller $Y_2$ for the adiabatic humidifier W.

In accordance with this, the humidifying capacity controller $Y_2$ conducts feedback control for the humidifying capacity such that the exit temperature of the adiabatic humidifier W detected by the temperature sensor $T_2$ is identical with the temperature for the end point $B_2$ of the adiabatic humidifying line $W_L$, by which the outside air state point $G_2$ progresses along the controlling line $J_2$ to the state point $B_2$ on the aimed temperature/humidity line Lo.

In this case, the main heater H and the cooler C are kept not-operated, while the auxiliary heater RH and the isothermal humidifier DS are operated in an idling state with the minimum heating capacity and the minimum humidifying capacity for fine control of temperature/humidity in accordance with the result of the detection by the temperature/humidity sensor $TH_2$.

Further, in the spring/autumn season at high relative humidity, the outside air state point $G_3$ is often included in the middle temperature/high humidity control area $A_3$. In this case, the control process setter $S_3$ sets, as the controlling line $J_3$, the auxiliary heating line $RH_L$ per se that progresses from the outside air state point $G_3$ to the temperature/humidity line Lo along the equal absolute humidity line in the heating direction on the psychrometric chart.

In this case, the main heater H has an excessively high heating capacity and can not conduct fine control even when the outside air state point $G_3$ were intended to shift by the main heater H. Accordingly, the auxiliary heater RH capable of fine control is used in the control area $A_3$.

Then, the aimed exit temperature setter 20 sets the temperature for the end point $B_3$ of the auxiliary heating line $RH_L$ of the controlling line $J_3$ (state point on the aimed temperature/humidity line Lo) as the aimed exit temperature for the auxiliary heater RH and outputs the set value to the auxiliary heating capacity controller $Y_4$.

In accordance with this, the auxiliary heating capacity controller $Y_4$ conducts feedback control for the heating capacity such that the exit temperature of the auxiliary heater RH detected by the temperature sensor $T_4$ is identical with the temperature for the end point $B_3$ of the auxiliary heating line $RH_L$, by which the outside air state point $G_3$ progresses along the controlling line $J_3$ to the state point $B_3$ on the aimed temperature/humidity line Lo.

In this case, the main heater H and the cooler C are kept not operated, while the adiabatic humidifier W is operated in an idling state with the minimum humidifying capacity so as to remove dusts contained in the outside air, and the isothermal humidifier Ds is operated in an idling state with the minimum humidifying capacity for the fine control of the humidity in accordance with the result of detection by the temperature/humidity sensor $TH_2$.

Further, the outside air state point $G_4$ or $G_5$ is often included in the summer season in the higher temperature control area $A_4$.

Then, when the outside air state point $G_4$ is included in the lower humidity area $d_1$ of the control area $A_4$, the control process setter $S_4$ sets the controlling line $J_4$ formed by sequentially connecting the adiabatic humidifying line $W_L$ progressing along the equal enthalpy line to the boundary line Wc in the humidifying direction and the cooling line $C_L$ progressing on the boundary line Wc to the upper limit state point Ps in the cooling direction on the psychrometric chart in this order.

Then, the aimed exit temperature setter 20 sets the temperature for the end point $B_4$ of the adiabatic humidifying line $W_L$ of the controlling line $J_4$ (crossing point between the adiabatic humidifying line $W_L$ and the boundary line Wc) as the aimed exit temperature of the adiabatic humidifier W, sets the temperature for the end point of the cooling line $C_L$ (upper limit state point Ps) as the aimed exit temperature of the cooler C, and outputs the respective aimed exit temperatures to the capacity controllers $Y_2$ and $Y_3$ for the adiabatic humidifier W and the cooler C, respectively.

In accordance with this, at first, the humidifying capacity controller $Y_2$ conducts feedback control for the humidifying capacity such that the exit temperature of the adiabatic humidifier W detected by the temperature sensor $T_2$ is identical with the temperature for the end point $B_4$ of the adiabatic humidifying line $W_L$. Then, the cooling capacity controller $Y_3$ conducts feedback control for the cooling capacity such that the exit temperature of the cooler C detected by the temperature sensor $T_3$ is identical with the end point temperature of the cooling line $C_L$ (temperature of the upper limit state point Ps), by which the outside air state point $G_4$ reaches the upper limit state point Ps along the controlling line $J_4$.

In this case, the main heater H is kept not operated while the auxiliary heater RH and the isothermal humidifier DS are operated in an idling state with the minimum heating capacity and the minimum humidifying capacity for fine control of temperature/humidity in accordance with the result of detection by the temperature/humidity sensor $TH_2$.

When the outside air state point $G_5$ is included in the higher humidity area $d_2$ of the control area $A_4$, the control process setter $S_4$ sets the controlling line $J_5$ formed by sequentially connecting the cooling line $C_L$ progressing from the outside air state point $G_5$ to the upper limit state point Ps, toward the cooling state point Pc with 100% relative humidity at the cooling temperature Tc of the cooler C to the upper limit absolute humidity line Ls, and the auxiliary heating line $RH_L$ progressing along the upper limit absolute humidity line Ls in the heating direction to the upper limit state point Ps on the psychrometric chart in this order.

The aimed exit temperature setter 20 sets the temperature for the end point $B_5$ of the cooling line $C_L$ of the controlling line $J_5$ (crossing point between the cooling line $C_L$ and the upper limit absolute humidity line Ls) as the aimed exit temperature of the cooler C, and sets the temperature for the end point of the auxiliary heating line $RH_L$ (upper limit state point Ps) as the aimed exit temperature of the auxiliary heater RH, and outputs the aimed exit temperatures to the capacity controllers $Y_3$ and $Y_4$ for the cooler C and the auxiliary heater RH, respectively.

In accordance with this, the cooling capacity controller $Y_3$ at first conducts feedback control for the cooling capacity such that the exit temperature of the cooler C detected by the temperature sensor $T_3$ is identical with the temperature for the end point $B_5$ of the cooling line $C_L$. Then, the auxiliary heating capacity controller $Y_4$ conducts feedback control for the heating capacity such that the exit temperature of the auxiliary heater RH detected by the temperature sensor $T_4$ is identical with the temperature for the end point of the auxiliary heating line $RH_L$ (upper limit state point Ps), by which the outside air state point $G_5$ progresses along the controlling line $J_5$ to the upper limit state point Ps.

In this case, the main heater H is kept not operated, while the adiabatic humidifier W is operated in an idling manner with the minimum humidifying capacity for removing dusts contained in the outside air, and the isothermal humidifier DS is operated in an idling state with the minimum humidifying capacity for feedback control of the heating capacity and the humidifying capacity in accordance with the result of detection by the temperature/humidity sensor $TH_2$.

As described above, in the first embodiment, since the main heater H, the adiabatic humidifier W, the cooler C and the auxiliary heater RH are put to feedback control independently by their respective outputs, their control amounts can be set simply and accurately independent of each other. In addition, since they are put to feedback control based on the exit temperature for each of the temperature/humidity adjusting devices 4, 4, - - -, the response speed is fast and the temperature/humidity can be controlled accurately to an optional state point on the aimed temperature/humidity line Lo.

Further, since they are controlled in accordance with each of the predetermined controlling lines $J_1$–$J_5$, wasteful controlling operations can be avoided thereby contributing to energy saving and reduction of running cost.

After starting the temperature/humidity control, the exit temperature detected by each of the temperature sensors $T_1$–$T_4$, and the aimed exit temperature set by the aimed exit temperature setter 20 are inputted to the abnormality detector 21, and the detector judges whether the difference is within a range of a predetermined allowable tolerance.

Then, if the difference between the exit temperature and the aimed exit temperature is not lowered to less than a level within the allowable tolerance even after the elapse of a predetermined period of time, the detector judges that abnormality is caused in the temperature/humidity adjusting devices 4, 4, - - -, and outputs an alarm signal to the alarming device 22.

For example, during control in accordance with the controlling line $J_1$ from the outside air state point $G_1$ to the lower limit state point Pw, the exit temperature of the main heater H detected by the temperature sensor $T_1$ is equal with the temperature at the outside air state point $G_1$ and the difference relative to the temperature for the end point $B_1$ of the main heating line $H_L$ as the aimed exit temperature is higher than the allowable tolerance range just after the start of the operation of the air conditioner 1.

Then, after the elapse of a predetermined period of time (for example, 2 min) after starting the control, if the difference between the exit temperature and the aimed exit temperature of the main heater H is lowered to less than the allowable range of tolerance, it can be judged that the main heater H is normal.

On the contrary, after the elapse of a predetermined period of time (for example, 2 min) after starting the control, if the difference between the exit temperature and the aimed exit temperature of the main heater H does not enter the allowable range of tolerance, it is judged that the main heater H is abnormal, and an alarm signal is outputted.

Further, during operation of the air conditioner H, if the exit temperature goes higher than the aimed exit temperature by excessive combustion of the main heater H or goes lower than the aimed exit temperature caused by combustion failure for instance, it can be judged that abnormality is caused also based on the difference between the exit temperature and the aimed exit temperature.

Further, such judgement can be done not only for the main heater H but also for the adiabatic humidifier W, the cooler C and the auxiliary heater RH.

Modified First Embodiment

Explanations have been made to the first embodiment in which the area in the psychrometric chart is previously divided into a plurality of control areas $A_1$–$A_4$, and each of the heating/humidifying devices 4, 4, - - - used in each of the areas is previously set. However, the present invention is not restricted to such an embodiment. For example, each of the temperature/humidity adjusting devices 4, 4, - - - to be used may be selected and the aimed exit temperature for each of the capacity controllers $Y_1$–$Y_5$ may be set by drawing each of the controlling lines $J_1$–$J_5$ from each of the outside air state points $G_1$–$G_5$ to an optional state point on the aimed temperature/humidity line Lo without previously dividing the area into the control areas $A_1$ to $A_4$.

Further, while the first embodiment has been explained in that the psychrometric chart is divided into the four control areas $A_1$–$A_4$, the area may be divided more finely depending on the number and the capacity of each of the temperature/humidity adjusting devices 4, 4, - - - installed for heating/humidifying/cooling operation.

For example, while the high temperature control area $A_4$ is divided into two control areas $d_1$ and $d_2$ relative to the boundary line Wc based on the cooling temperature Tc of the cooler C, other control areas $A_1$ to $A_3$ may also be divided further like that for the high temperature control area $A_4$.

Further, the first embodiment has been explained as having the main heater H, the adiabatic humidifier W, the cooler C, the auxiliary heater RH and the isothermal humidifier DS as the temperature/humidity adjusting devices 4, 4, - - - . However, the present invention is not restricted to this embodiment but applicable also to other air conditioners, for example, an air conditioner designed for cold districts and not having the cooler C, or an air conditioner designed for warm/tropical districts not having the main heater H.

In this case, in the air conditioner not having the cooler C, for example, control is not possible if the outside air state point $G_4$, $G_5$ should be included in the high temperature control area $A_4$. However, since the air conditioner of this design is used in the cold district where the outside air state point $G_4$, $G_5$ can not be actually present in such control area $A_4$, there is no problems.

Furthermore, the upper limit state point Ps and the lower limit state point Pw are not necessarily be set separately but they may be set as an identical state point, in which the aimed temperature/humidity line Lo is also set as one point and, accordingly, the middle temperature/low humidity control area $A_2$ and the middle temperature/high humidity control area $A_3$ are no more present.

Second Embodiment

Figure 3:
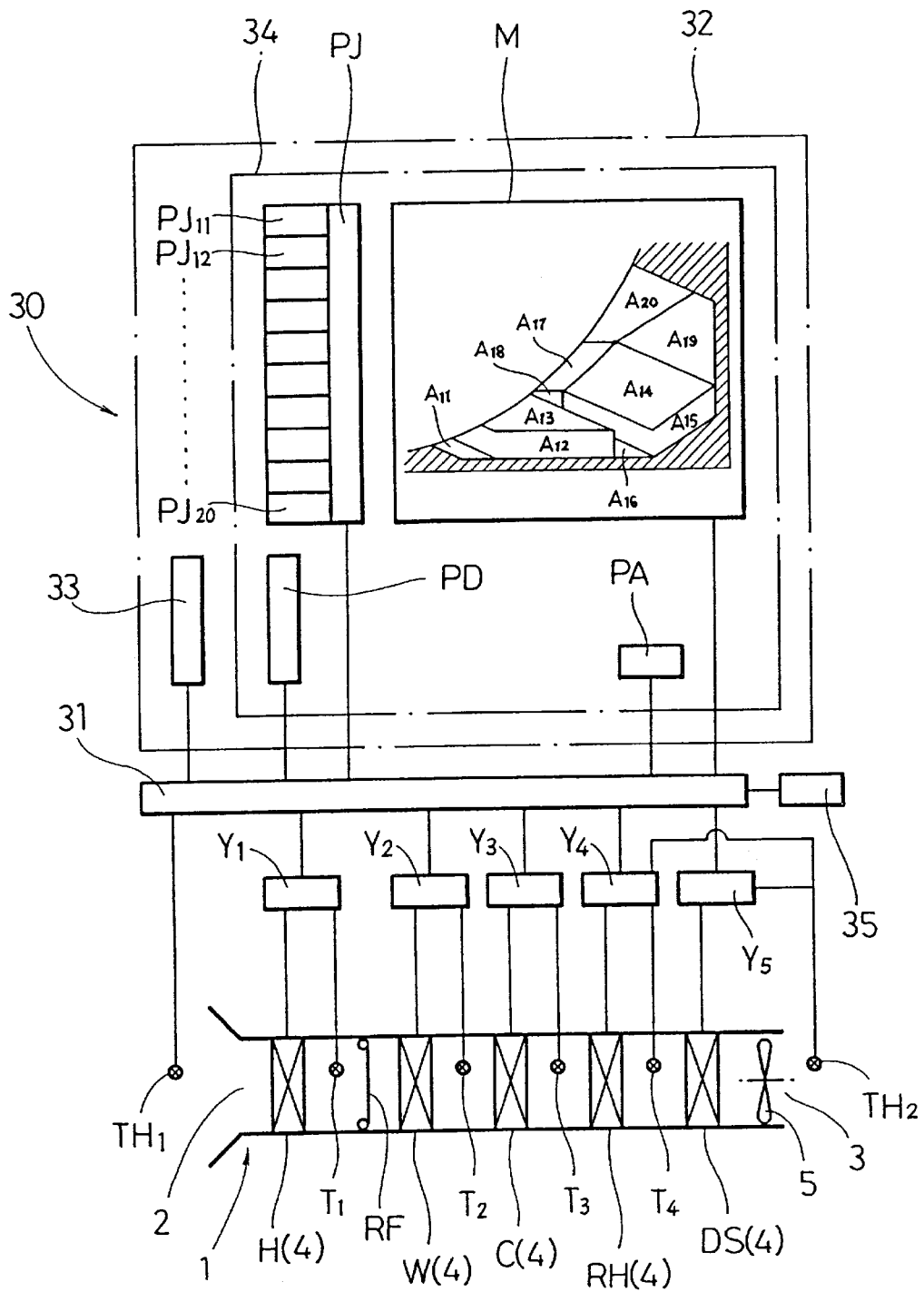
FIG. 3 is a block diagram of a temperature/humidity controller for an air conditioner as another embodiment of the present invention.

A temperature/humidity controller 30 for an air conditioner shown in FIG. 3 is adapted such that a main controller 32 is operated in accordance with computer programs, in which portions or components in common with those in the first embodiment carry the same reference numerals for which detailed explanations are to be omitted.

In the temperature/humidity controller 30, a temperature/humidity sensor $TH_1$ is connected by way of an I/O port 31 to the input of a main controller 32, and capacity controllers $Y_1$–$Y_5$ for controlling the capacity of temperature/humidity adjusting devices 4, 4, - - - are connected to the output of the main controller 32.

The capacity controllers $Y_1$–$Y_5$ are connected, at the input thereof, with temperature sensors $T_1$–$T_4$ and a temperature/humidity sensor $TH_2$ disposed at the exit for the temperature/humidity adjusting devices 4, 4, - - - , respectively. Further, the temperature/humidity adjusting devices 4, 4, - - - are connected to the output of the capacity controllers $Y_1$–$Y_5$ respectively. Each of the controllers $Y_1$–$Y_5$ conducts feedback control for the capacity of each of the temperature/humidity adjusting devices 4, 4, - - - such that each of the detected exit temperature/exit humidity is identical with each of the aimed exit temperature/aimed exit humidity supplied from the main controller 32 as the data.

The temperature/humidity sensor $TH_2$ disposed to the conditioned air supply port 3 inputs the detected temperature data to the auxiliary heating capacity controller $Y_4$ and also inputs the detected humidity data to the isothermal humidifying capacity controller $Y_5$. The auxiliary heating capacity controller $Y_4$ amends the capacity of the auxiliary heater RH based on the temperature data inputted from the temperature/humidity sensor $TH_2$.

The main controller 32 has a CPU 33 for calculating the aimed exit temperature or aimed exit humidity for each of the temperature/humidity adjusting devices 4, 4, - - - when the temperature/humidity data of the outside air is inputted from the temperature/humidity sensor $TH_1$ for detecting the temperature/humidity of the outside air by each of the outside air state points $G_{11}$–$G_{20}$ determined by the temperature/humidity in accordance with a predetermined program and a memory 34 for storing programs to be executed by the CPU 33.

The memory 34 stores, recorded therein, a control map M in which a psychrometric chart is divided into a plurality of control areas $A_{11}$–$A_{20}$, a control area judging program PA for judging the control areas $A_{11}$–$A_{20}$ of the control map M which includes the outside air state points $G_{11}$–$G_{20}$ when temperature/humidity of the outside air is inputted, a controlling line setting program PJ for setting controlling lines $J_{11}$–$J_{20}$ from the outside air state points $G_{11}$–$G_{20}$ to the state point on the aimed temperature/humidity of the conditioned air in accordance with the control areas $A_{11}$–$A_{20}$ each including each outside air state point ($G_{11}$–$G_{20}$), and an aimed exit temperature/humidity setting program PD for calculating the aimed exit temperature or the aimed exit humidity of each of the temperature/humidity adjusting devices 4, 4, - - - based on each of the controlling lines $J_{11}$–$J_{20}$ set by the controlling line setting program PJ.

The control map M, the control area judging program PA, the controlling line setting program PJ and the aimed exit temperature/humidity setting program PD are supplied by way of recording media such as an M/O disk or a floppy disk.

In FIG. 3, reference numeral 15 denotes a display for graphic display of the outside air state points $G_{11}$–$G_{20}$, the controlling lines $J_{11}$–$J_{20}$, and temperature/humidity data detected by each of the temperature sensors $T_1$–$T_4$ and the temperature/humidity sensor $TH_2$, while are superposed on the control map M.

As the condition data for setting the control map M, the following data are used for instance:

Ts: aimed upper limit temperature of the conditioned air
Φs: aimed upper limit humidity of the conditioned air
Tw: aimed lower limit temperature of the conditioned air
Φw: aimed lower limit humidity of the conditioned air
Hmax: maximum heating capacity of the main heater H
Hmin: minimum heating capacity of the main heater H
Wmax: maximum humidifying capacity of the adiabatic humidifier W
Cmax: maximum cooling capacity of the cooler C
Tc: cooling temperature of the cooler C
RHmax: maximum heating capacity of the auxiliary heater RH
DSmax: maximum humidifying capacity of the isothermal humidifier DS
Tmax: upper limit set value for outside air temperature.

In this case, the data regarding the capacity of each of the temperature/humidity adjusting devices 4, 4 - - - are determined in accordance with the flow rate of air when the air conditioner 1 is operated.

Further, when the temperature/humidity of the conditioned air are kept constant through the year, the upper limit temperature/humidity Ts, ΦS for the conditioned air and the lower limit temperature/humidity Tw, ΦW of the conditioned air are set to identical values.

Further, the data may be set as: Hmax=0 and Hmin=0 if the air conditioner is designed for tropical districts and has no main heater H, while the data may be set as: Cmax=0, if the air conditioner is designed for cold districts and has no cooler C.

Figure 4:
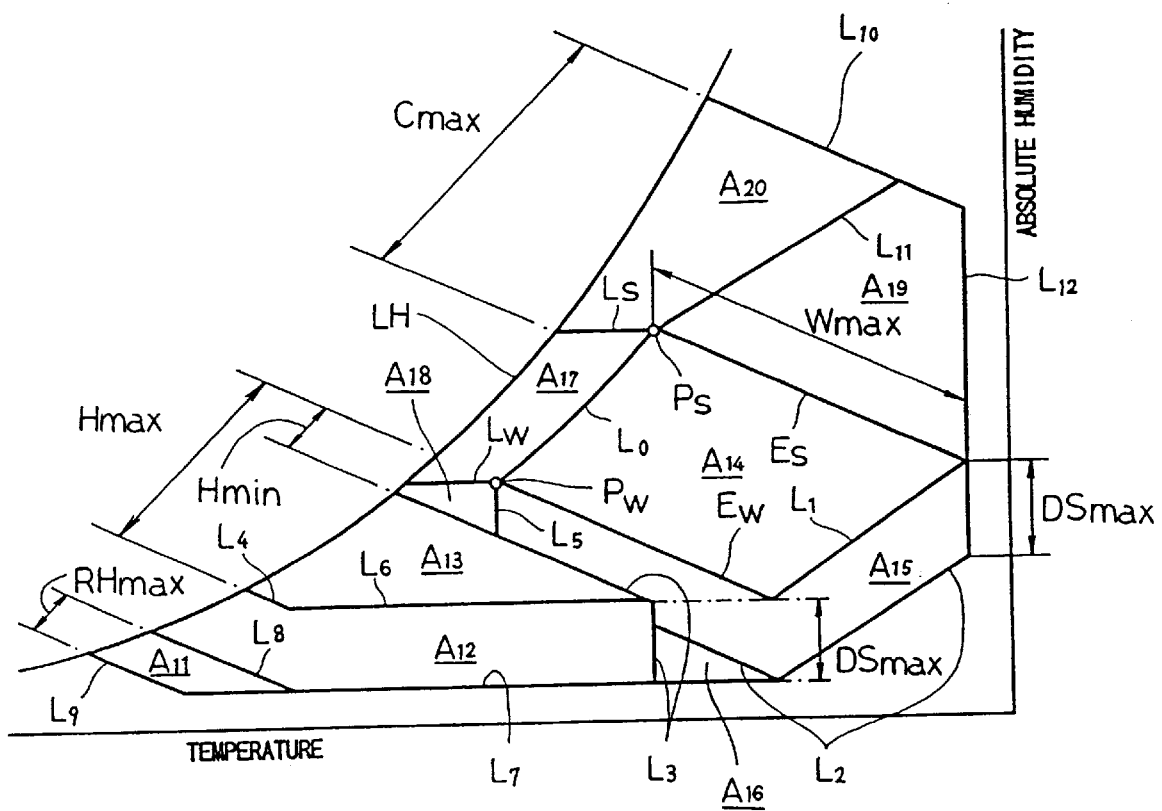
FIG. 4 is a psychrometric chart showing control operations thereof.

Based on the data described above, a control map M is prepared as shown in FIG. 4.

In the control map M, the following state points and lines are set as numerical data or formulated data on the psychrometric chart:

Ps: an upper limit state point defined by the aimed upper limit temperature/humidity Ts, ΦS for the conditioned air, Pw: a lower limit state point defined by the aimed lower limit temperature/humidity Tw, ΦW for the conditioned air, Lo: an aimed temperature/humidity line representing the temperature/humidity of the conditioned air in the middle temperature season by a line connecting the upper limit state point Ps and the lower limit state point Pw, Ls, Lw: upper and lower limit auxiliary heating lines for setting a region capable of reaching the aimed temperature/ humidity line Lo by the auxiliary heating operation, the line being represented by an equal absolute humidity line each extending from the upper limit state point Ps and the lower limit state point Pw to each of the dew points, Es, Ew: upper limit and lower limit enthalpy lines each extending from the upper limit state point Ps and the lower limit state point Pw toward a higher temperature region in parallel with the equal enthalpy line, $L_1$: an adiabatic humidifying capacity line representing a region put between the upper limit and the lower limit enthalpy lines Es and Ew, capable of reaching the aimed temperature/humidity line Lo by the adiabatic humidifying operation, being represented by a line set toward a lower humidity region by so much as humidification in accordance with the maximum humidifying capacity Wmax of the adiabatic humidifier W relative to the aimed temperature/humidifying line Lo, $L_2$: a total humidifying capacity which represents the lower limit capable of reaching the aimed temperature/ humidification line Lo by the combined use of the adiabatic humidifying operation and the isothermal humidifying operation, being represented by a line formed by shifting the lower limit enthalpy line Ew and the adiabatic humidifying capacitor line $L_1$ toward a lower humidity region along the isothermal line in accordance with the maximum humidifying capacity Dsmax of the isothermal humidifier DS, $L_3$: a minimum main heating capacity line which represent the minimum heating, being represented by a line formed by shifting the lower limit enthalpy line Ew toward a lower temperature region by so much as the temperature in accordance with the minimum heating capacity Hmin of the main heater H and extending a line from the lower end in parallel with the isothermal line, capacity that can be controlled stably by the main heater H, $L_4$: a maximum main heating capacity line that represents a lower limit enthalpy capable of reaching the enthalpy at the lower limit state point Pw by the main heating operation, the line being represented by an equal enthalpy line lower than the enthalpy at the lower limit state point Pw by so much as the enthalpy for the maximum heating capacity Hmax of the main heater H, $L_5$: an isothermal humidifying lower limit temperature line that represents the lowest temperature capable of reaching the lower limit state point Pw by the isothermal humidifying operation, the line being represented by a line suspended from the lower limit state point Pw along the isothermal line, $L_6$: an adiabatic humidifying lower limit humidity line that represents the lower limit absolute humidity that can be humidified to a humidity equal with the absolute humidity at the lower limit state point Pw by the adiabatic humidifying operation, the line being represented by a line of the absolute humidity equal to that at the crossing point between the lower limit enthalpy line Ew and the adiabatic humidifying capacity setting line $L_1$, $L_7$: a total humidifying lower limit humidity line that represents the lower limit absolute humidity that can be humidified to a humidity equal with the absolute humidity at the lower limit state point Pw by the adiabatic humidifying operation and the isothermal humidifying operation, the line being represented by an equal absolute humidity line that passes the lower limit absolute humidity point of the entire humidifying capacity line $L_2$, $L_8$: a main heating limit line that represents a lower limit temperature that can be heated to the lower limit state point Pw without conducting auxiliary heating operation, the line being represented by an equal enthalpy line extending from the point on the total humidifying lower limit humidity line $L_7$ corresponding to the temperature at the crossing point between the main heating capacity line $L_4$ and the adiabatic humidifying lower humidity line $L_6$ toward a lower temperature region, $L_9$: a total heating lower limit temperature line that represents the lower limit temperature that can be heated to the lower limit state point Pw by the main heating operation and the auxiliary heating operation, the line being represented by an equal enthalpy line shifted in parallel with the main heating limit line $L_8$ to a lower enthalpy region by so much as the enthalpy in accordance with the maximum heating capacity RHmax at the maximum amount of heat supplied to the auxiliary heater RH, $L_{10}$: a cooling limit line that represents the upper limit temperature/humidity that can be dehumidified to the absolute humidity at the upper limit state point Ps, the line being represented by a line set to a higher enthalpy region than the enthalpy at the dew point for the upper limit state point Ps by so much as the enthalpy for the maximum cooling capacity Cmax of the cooler C, $L_{11}$: a cooling line extending from the upper limit state point Ps toward a high temperature region, the line being represented by an extension connecting the cooling state point Pc with 100% relative humidity at the cooling temperature Tc of the cooler C and the upper limit state point Ps, and $L_{12}$: an upper limit temperature line in accordance with the outside air temperature upper limit set value Tmax.

A control map M is formed by dividing the psychrometric chart into a plurality of the following control areas $A_{11}$–$A_{20}$ for which the combination of the temperature/humidity adjusting devices 4, 4, - - - is different, based on the data set as described above. Each of the control areas $A_{11}$–$A_{20}$ is expressed as below:

$A_{11}$: a control area for low temperature/low humidity in a low temperature season, surrounded with the total heating lower limit temperature line $L_9$, the total humidifying lower limit humidity line $L_7$, the main heating limit line $L_8$ and the saturated steam pressure line LH, $A_{12}$: a control area for high temperature/low humidity in a low temperature season, surrounded with the main heating limit line $L_8$, the total humidifying lower limit humidity line $L_7$, the minimum main heating capacity setting line $L_3$, the adiabatic humidifying lower limit humidity line $L_6$, the maximum main heating capacity setting line $L_4$ and the saturated steam pressure line LH, $A_{13}$: a control area for high temperature/high humidity in a low temperature season, surrounded with the maximum main heating capacity setting line $L_4$, the adiabatic humidifying lower limit humidity line $L_6$, the minimum main heating capacity setting line $L_3$ and the saturated steam pressure line LH, $A_{14}$: a control area for high temperature/high humidity in a middle temperature season, surrounded with the aimed temperature/humidity line Lo, the lower limit enthalpy line Ew, the adiabatic humidifying capacity setting line $L_1$ and the upper limit enthalpy line Es.

$A_{15}$: a control area for low humidity in a middle temperature season, surrounded with the lower enthalpy line Ew, the adiabatic humidifying setting line $L_1$, the upper limit temperature line $L_{12}$, the total humidifying capacity setting line $L_2$, the minimum main heating capacity setting line $L_3$, and the isothermal humidifying lower limit temperature line $L_5$, $A_{16}$: a control area for low enthalpy in a middle temperature season, surrounded with the entire humidifying lower limit humidity line $L_7$, the total humidity capacity setting line $L_2$, and the minimum main heating capacity line $L_3$, $A_{17}$: a control area for high humidity in a middle temperature season, surrounded with the upper limit enthalpy line Es, the aimed temperature/humidity line Lo, the lower enthalpy line Ew and the saturated steam pressure line LH, $A_{18}$: a control area for low temperature in a middle temperature season, surrounded with the lower enthalpy line Ew, the isothermal humidifying lower limit temperature line $L_5$ and the minimum main heating capacity setting line $L_3$, $A_{19}$: a control area for low humidity in a high temperature season, surrounded with the upper limit enthalpy line Es, the upper limit temperature line $L_{12}$, the cooling limit line $L_{10}$ and the cooling line $L_{11}$, and $A_{20}$: a control area for high humidity in a high temperature season, surrounded with the cooling limit line $L_{10}$, the cooling line $L_{11}$, the upper limit auxiliary heating line Ls and the saturated steam pressure line LH.

When temperature/humidity of the outside air are detected by the temperature/humidity sensor $TH_1$, the control area judging program PA judges a control area ($A_{11}$–$A_{20}$) of the control map M which includes an the outside air state point ($G_{11}$–$G_{20}$) determined by the temperature/humidity. For example, if a state point belongs to the control area $A_{11}$, the program outputs "$A_{11}$" as the data.

When the control area ($A_{11}$–$A_{20}$) is set by the control area judging program PA, the controlling line setting program PJ sets a controlling line ($J_{11}$–$J_{20}$), on the control map M, from the outside air state point ($G_{11}$–$G_{20}$) to the nearest state point on the aimed temperature/humidity line Lo, by sequentially connecting necessary lines selected from the following lines in the order of:

a main heating line $H_L$: a line progressing along the equal absolute humidity line in the heating direction (horizontally to the right), an adiabatic humidifying line $W_L$: a line progressing a long the equal enthalpy line in the humidifying direction (obliquely upwardly to the left), a cooling line $C_L$: a line progressing toward the cooling temperature Tc set lower than the dew point for the upper limit state point Ps, an auxiliary heating line $RH_L$: a line progressing along the equal absolute humidity line in the heating direction (horizontally to the right), and an isothermal humidifying line $DS_L$: a line progressing along the isothermal line in the humidifying direction (vertically upwardly).

The controlling line ($J_{11}$–$J_{20}$) is set by each of subroutines $PJ_{11}$–$PJ_{20}$ corresponding to the control area ($A_{11}$–$A_{20}$), each including the outside air state point ($G_{11}$–$G_{20}$).

Figure 5A:
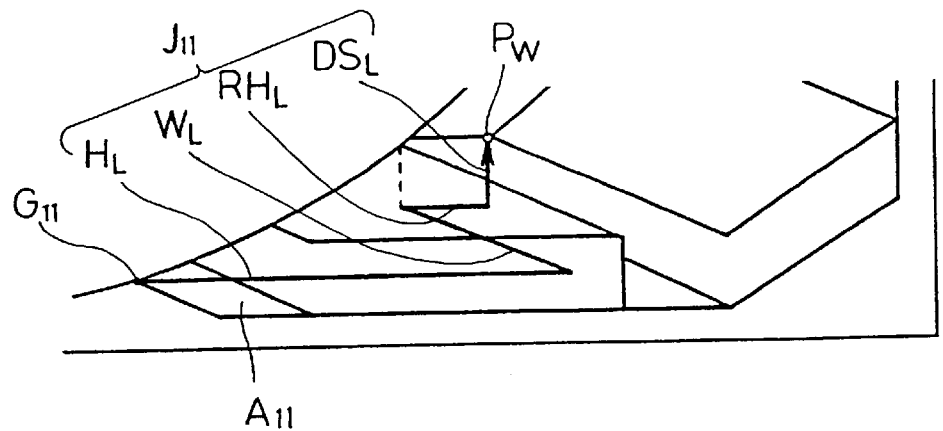

The control area $A_{11}$ for low temperature/low humidity in the low temperature season represents a range capable of reaching the lower limit state point Pw by the main heater H, the adiabatic humidifier W, the auxiliary heater RH and the isothermal humidifier DS. The subroutine $PJ_{11}$ corresponding to this area sets the controlling line $J_{11}$ formed by sequentially connecting the main heating line $H_L$, the adiabatic humidifying line $W_L$, the auxiliary heating line $RH_L$ and the isothermal humidifying line $DS_L$ in this order from the outside air state point $G_{11}$ to the lower limit state point Pw as shown in FIG. 5(a).

Figure 5B:
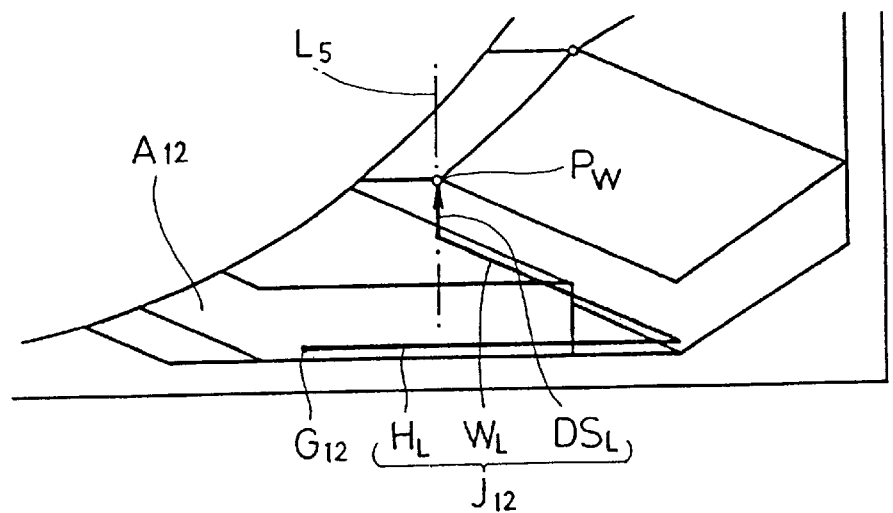

The control area $A_{12}$ for high temperature/low humidity in the low temperature season represents a range capable of reaching the lower limit state point Pw by the main heater H, the adiabatic humidifier W and the isothermal humidifier DS. The subroutine $PJ_{12}$ corresponding to this area sets the controlling line $J_{12}$ formed by sequentially connecting the main heating line $H_L$, the adiabatic humidifying line $W_L$ and the isothermal humidifying line $DS_L$ in this order from the outside air state point $G_{12}$ to the lower limit state point Pw as shown in FIG. 5(b).

Figure 5C:
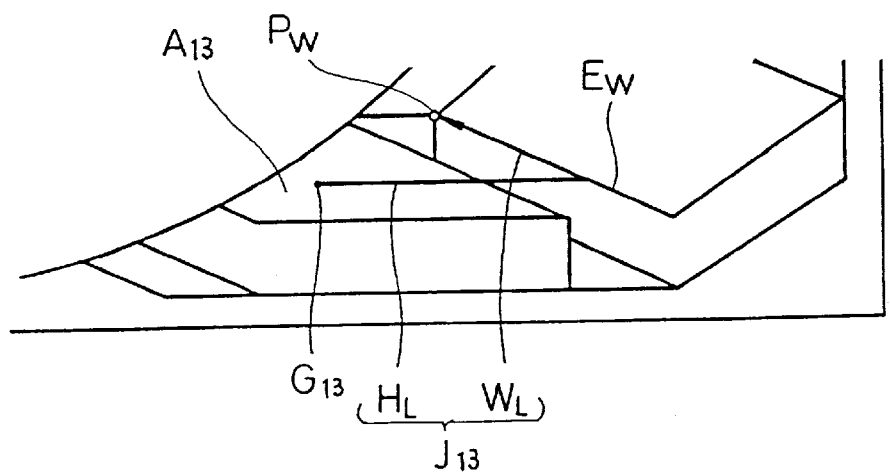

The control area $A_{13}$ for high temperature/high humidity in the low temperature season represents a range capable of reaching the lower limit state point Pw by the main heater H and the adiabatic humidifier W. The subroutine $PJ_{13}$ corresponding to this area sets the controlling line $J_{13}$ formed by sequentially connecting the main heating line $H_L$ and the adiabatic humidifying line $W_L$ in this order from the outside air state point $G_{13}$ to the lower limit state point Pw as shown in FIG. 5(c).

Figure 6A:
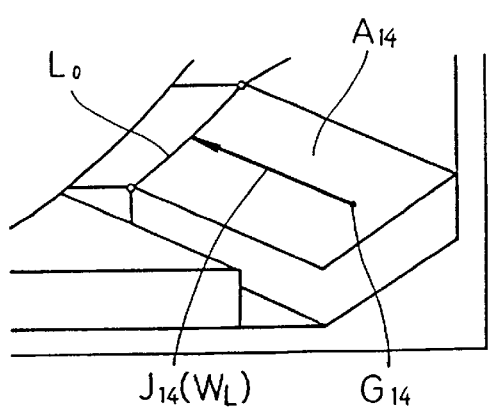

The control area $A_{14}$ for high temperature in the middle temperature season represents a range capable of reaching a point on the aimed temperature/humidity line Lo only by the adiabatic humidifier W. The subroutine $PJ_{14}$ corresponding to this area sets the controlling line $J_{14}$ by the adiabatic humidifying line $W_L$ from the outside air state point $G_{14}$ to the aimed temperature/humidify line Lo as shown in FIG. 6(a).

Figure 6B:
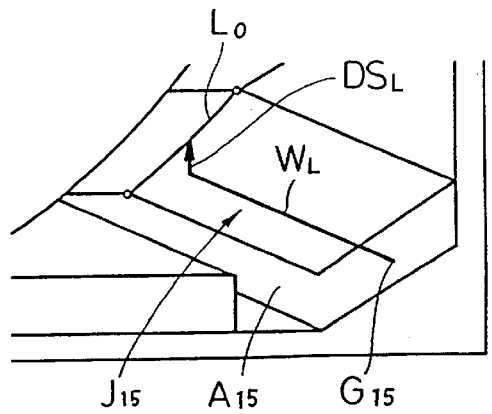

The control area $A_{15}$ for low humidity in the middle temperature season represents a range capable of reaching a point on the aimed temperature/humidity line Lo by the adiabatic humidifier W and the isothermal humidifier Ds. The subroutine $PJ_{15}$ corresponding to this area sets the controlling line $J_{15}$ formed by sequentially connecting the adiabatic humidifying line $W_L$ and the isothermal humidifying line $DS_L$ in this order from the outside air state point $G_{15}$ to a point on the aimed temperature/humidity line Lo as shown in FIG. 6(b).

Figure 6C:
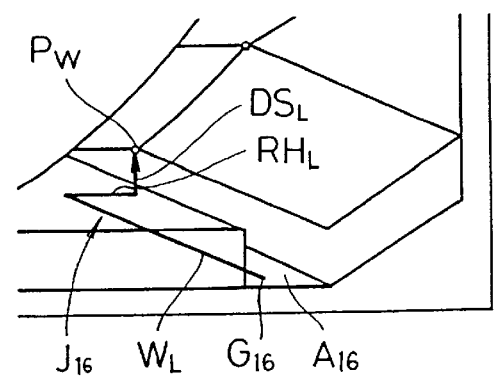

The control area $A_{16}$ for low enthalpy in the middle temperature season represents a region capable of reaching the lower limit state point Pw by the adiabatic humidifier W, the auxiliary heater RH and the isothermal humidifier DS. If the main heater H were operated, since its heating capacity is excessively large, this would result in insufficient humidity or goes beyond the lower limit state point Pw. The subroutine $PJ_{16}$ corresponding to this area sets the controlling line $J_{16}$ formed by sequentially connecting the adiabatic humidifying line $W_L$, the auxiliary heating line $RH_L$ and the isothermal humidifying line $DS_L$ in this order from the outside air state point $G_{16}$ to a point on the aimed temperature/humidity line Lo as shown in FIG. 6(c).

Figure 6D:
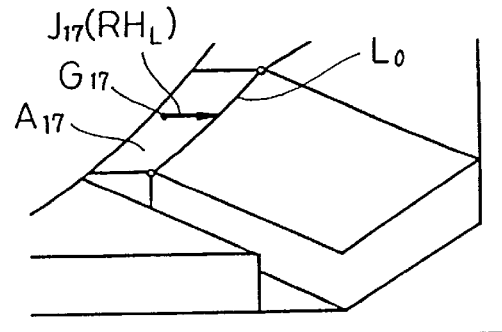

The control area $A_{17}$ for high humidity in the middle temperature season represents a range capable of reaching a point on the aimed temperature/humidity line Lo only by using the auxiliary heater RH but resulting in overheating, if the main heater H were used in this area. The subroutine $PJ_{17}$ corresponding to this area sets the auxiliary heating line $RH_L$ as the controlling line $J_{17}$ from the outside air state point $G_{17}$ to a point on the aimed temperature/humidity line Lo as shown in FIG. 6(d).

Figure 6E:
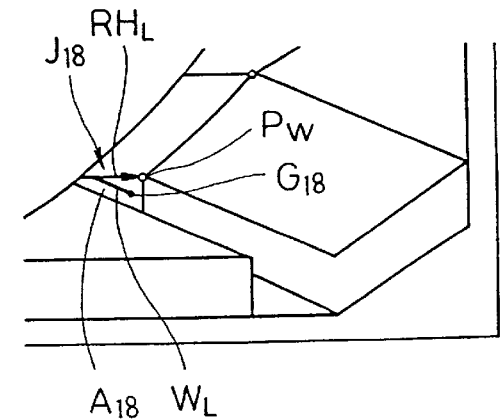
Figure 8:
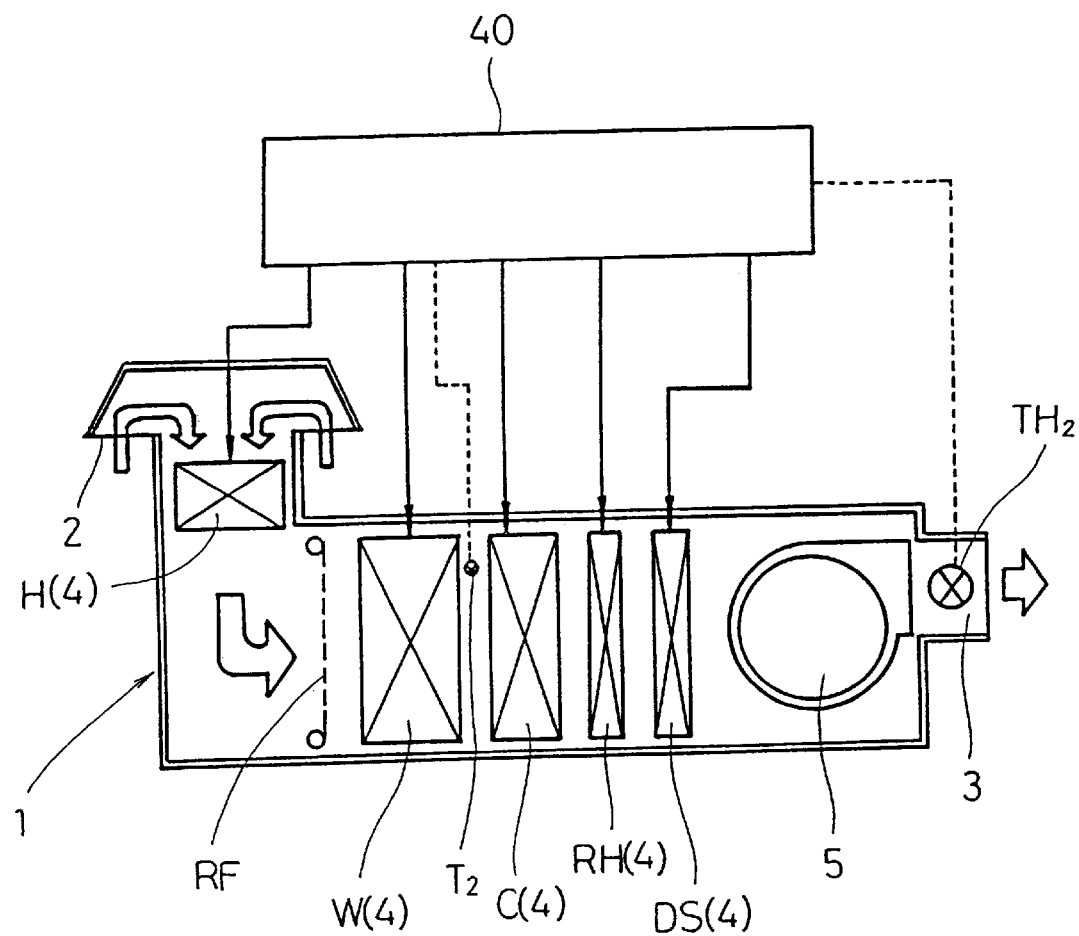
FIG. 8 is a block diagram of a temperature/humidity controller for an air conditioner of the prior art.
Figure 9:
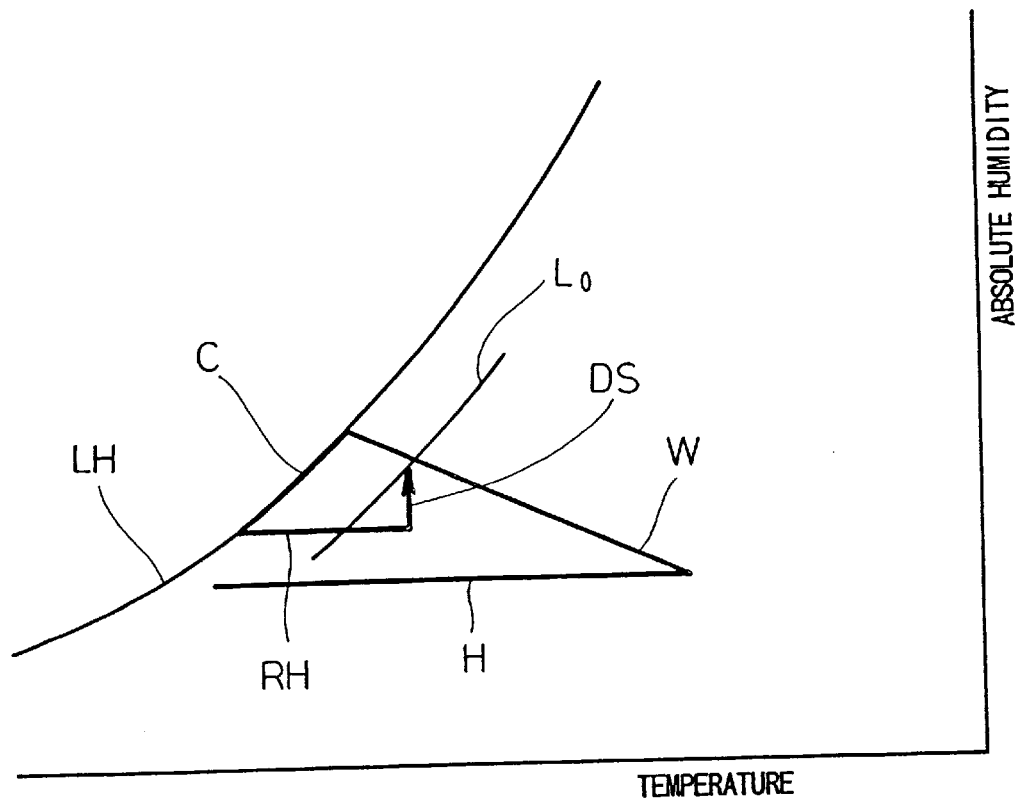
FIG. 9 is a psychrometric chart showing control operations thereof.
Figure 10:
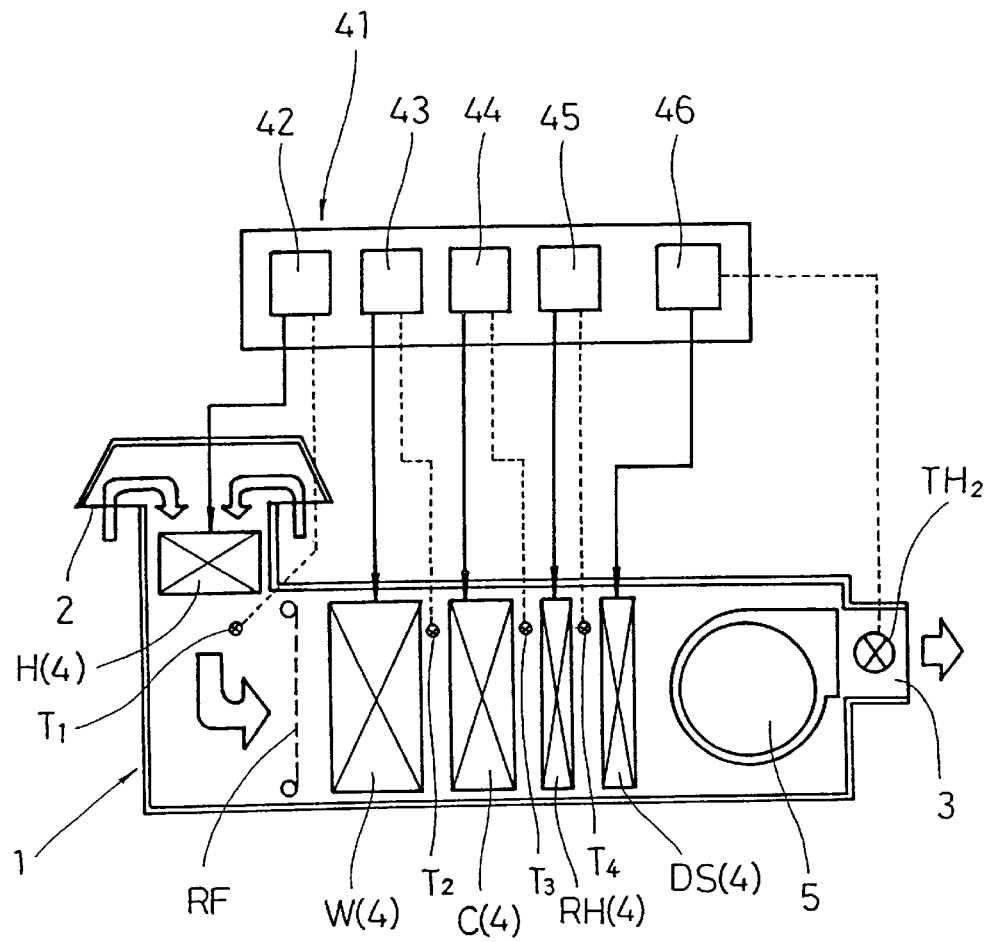
FIG. 10 is a block diagram of a modified temperature/humidity controller for an air conditioner of the prior art.
Figure 11:
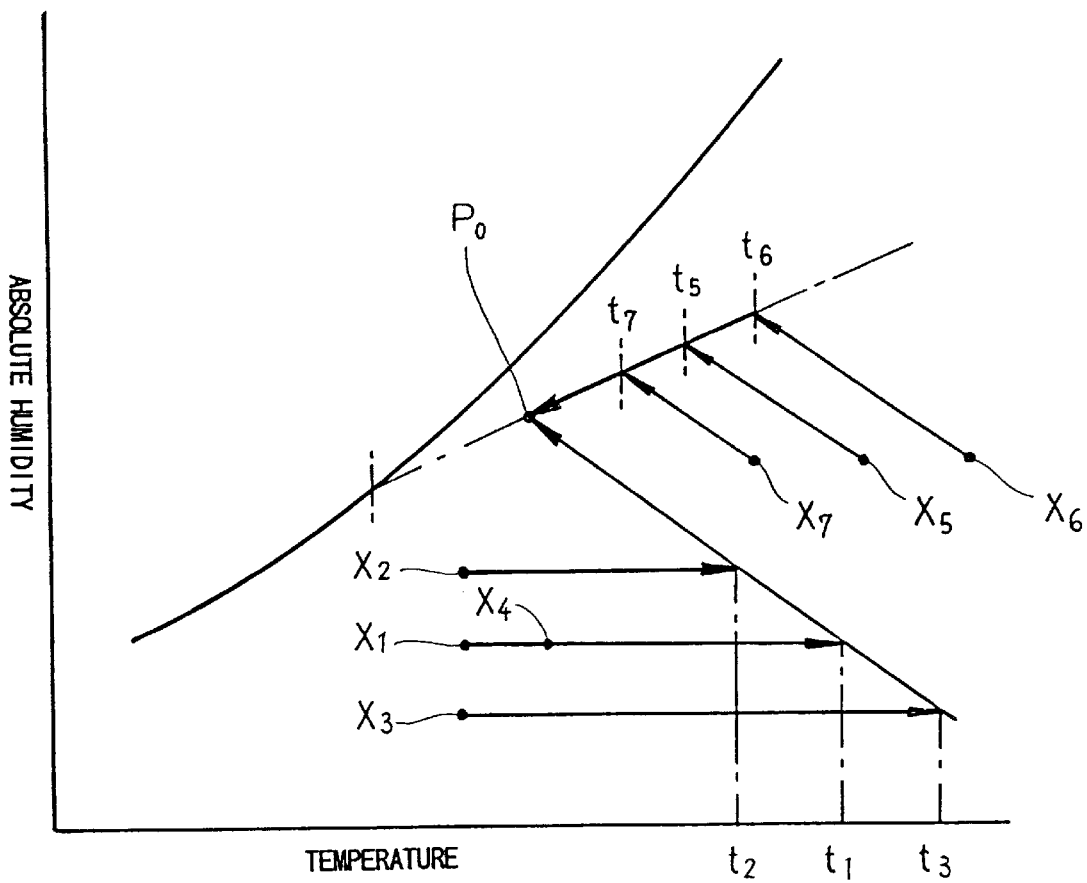

The control area $A_{18}$ for low temperature in the middle temperature season represents a region capable of reaching the lower limit state point Pw by the adiabatic humidifier W and the auxiliary heater RH. The subroutine $PJ_{18}$ corresponding to this area sets the controlling line $J_{18}$ formed by sequentially connecting the adiabatic humidifying line $W_L$ and the auxiliary heating line $RH_L$ in this order from the outside air state point $G_{18}$ to the lower limit state point Pw as shown in FIG. 6(e).

The control area $A_{19}$ for low humidity in the high temperature season represents a range capable of reaching the higher limit state point Ps by the adiabatic humidifier W and the cooler C. The subroutine $PJ_{19}$ corresponding to this area sets the controlling line $J_{19}$ formed by sequentially connecting the adiabatic humidifying line $W_L$ and the cooling line $C_L$ in this order from the outside air state point $G_{19}$ to the upper limit state point Ps as show n in FIG. 7(a).

The control area $A_{20}$ for high humidity in the high temperature season represents a range capable of reaching the higher limit state point Ps by the cooler C and the auxiliary heater RH. The subroutine $PJ_{20}$ corresponding to this area sets the controlling line $J_{20}$ formed by sequentially connecting the cooling line $C_L$ and the auxiliary heating line $RH_L$ in this order from the outside air state point $G_{20}$ to the upper limit state point Ps as shown in FIG. 7(b).

Then, when the controlling line ($J_{11}$–$J_{20}$) is set by the controlling line setting program PJ, the aimed exit temperature/humidity setting program PD calculates, based on the setting, the end point temperature for each of the main heating line $H_L$, the adiabatic humidifying line $W_L$, the cooling line $C_L$, the auxiliary heating line $RH_L$ and the isothermal humidifying line $DS_L$ as the aimed exit temperature or the aimed exit humidity for each of the main heater H, the adiabatic humidifier W, the cooler C, the auxiliary heater RH and the isothermal humidifier DS provided in the air conditioner 1.

When each of the aimed exit temperatures and aimed exit humidities calculated as described above is inputted into the capacity controller ($Y_1$–$Y_5$) for the temperature/humidity adjusting devices (4, 4 - - - ), the capacity for each of the temperature/humidity adjusting devices (4, 4 - - - ) is put to feedback control such that the exit temperature or the exit humidity for each of them detected by the temperature sensor ($T_1$–$T_4$) or the temperature/humidity sensor $TH_2$ disposed to the exit of the temperature/humidity adjusting device (4, 4 - - - ) is identical with each of the aimed exit temperatures or the aimed exit humidities.

Operation of the Second embodiment

The constitution of the second embodiment has been described above and the operation thereof will be explained.

Figure 2:
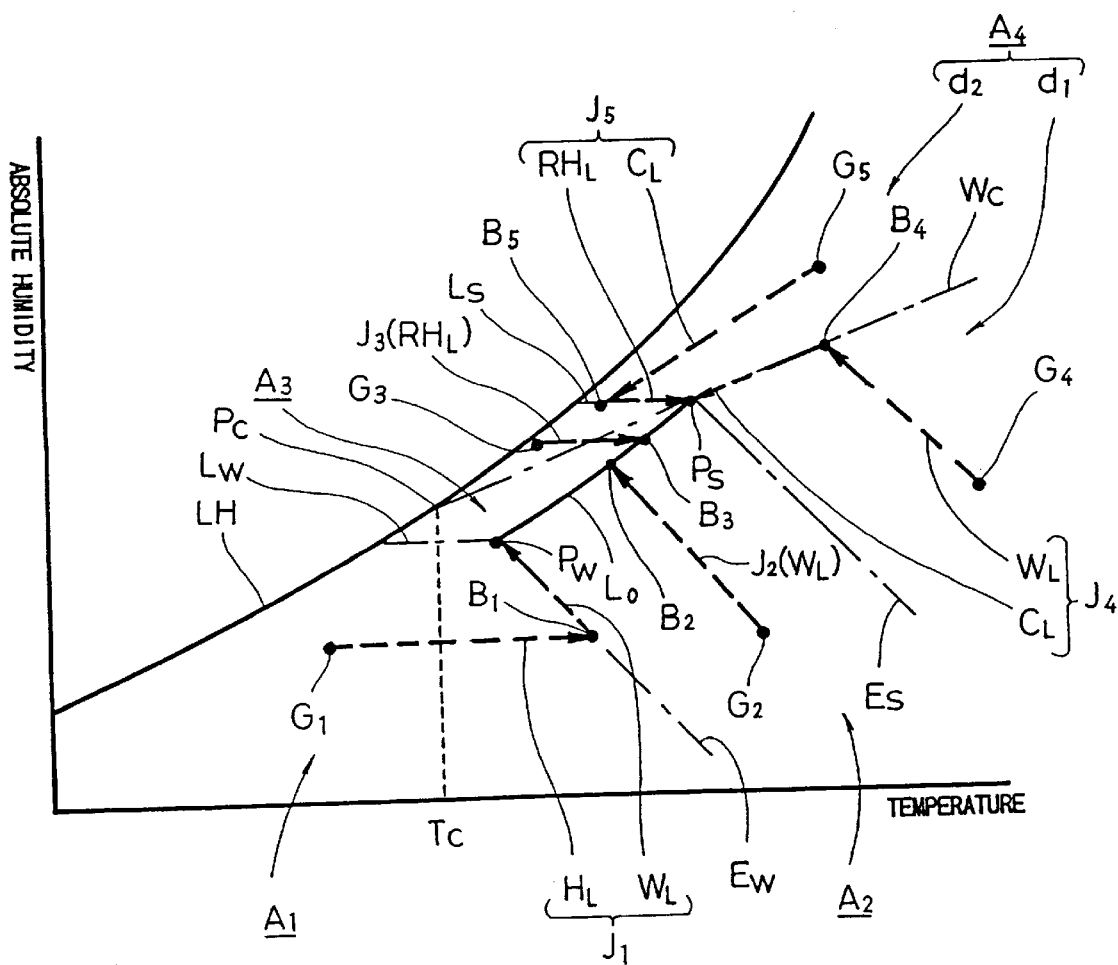
FIG. 2 is a psychrometric chart showing control operations thereof.

For example, a control map as shown in FIG. 2 is set in a case of controlling temperature/humidity of an air conditioner that controls the atmospheric temperature in a coating booth when the condition setting data for the air conditioner 1 are set as shown below:

aimed temperature/humidity for conditioned air in the summer season: Ts=28° C., $\phi$s=75%, aimed temperature/humidity for conditioned air in the winter season: Tw=20° C., $\phi$s=75%, maximum heating capacity of main heater H: Hmax=500,000 kcl/1 hr minimum heating capacity: Hmin=100,000 kcal/1 hr.

maximum humidifying capacity of adiabatic humidifier (humidifying capacity when operated at maximum humidifying efficiency of 80%): Wmax=440 kg/hr maximum cooling capacity of cooler C: Cmax=500,000 kcal/hr cooling temperature of cooler C: Tc=7° C.

maximum heating capacity of auxiliary heater RH: RHmax=100,000 kcal/hr maximum humidifying capacity of isothermal humidifier DS: Dsmax=150 kg/hr upper limit outside air temperature: Tmax=43° C., The capacity for each of the temperature/humidify adjusting devices (4, 4 - - - ) is determined by the flow rate of the air conditioner 1 ($m^3$/hr), and the capacity is set in this embodiment, for example, at the flow rate of 55,000 $Nm^3$/hr.

The thus set control map M, the control area judging program PA, the controlling line setting program PJ and the aimed exit temperature/humidity setting program PD corresponding thereto are read from recording media for recording them into a memory 34, and the temperature/humidity controller 30 conducts control for the temperature and humidity of the air conditioner 1.

At first, when the outside air temperature/humidity is detected by the temperature/humidity sensor $TH_1$, it is read into the CPU 33 of the main controller 32, and a control area ($A_{11}$–$A_{20}$) on the control map M which includes the outside air state point ($G_{11}$–$G_{20}$) is set by the control area judging program PA.

Then, when the control area ($A_{11}$–$A_{20}$) is set, a subroutine ($PJ_{11}$–$PJ_{20}$) of the controlling line setting program PJ is selected corresponding to the control area ($A_{11}$–$A_{20}$), and a controlling line ($J_{11}$–$J_{20}$) from the outside air state point ($G_{11}$–$G_{20}$) to the state point of the aimed temperature/humidity of the conditioned air is set by the subroutine ($PJ_{11}$–$PJ_{20}$).

Then, the end point temperature for each of the main heating line $H_L$, the adiabatic humidifying line $W_L$, the cooling line $C_L$, the auxiliary heating line $RH_L$, and the isothermal humidifying line $DS_L$ is calculated as the aimed exit temperature or the exit humidity for each of the main heater H, the adiabatic humidifier W, the cooler C, the auxiliary heater RH and the isothermal humidifier DS provided to the air conditioner 1, which is then outputted by way of the I/O port 31 to each of the capacity controllers $Y_1$–$Y_5$.

Since each of the capacity controllers $Y_1$–$Y_5$ conducts feedback control for the capacity of each of the temperature/humidity adjusting devices 4, 4 - - - such that the exit temperature/exit humility detected by the temperature sensors $T_1$–$T_4$ and the temperature/humidity sensor $TH_2$ are identical with the aimed exit temperature/aimed exit humidity calculated by the main controller 32, so that the state of the outside air progresses in accordance with the set controlling line ($J_{11}$–$J_{20}$).

In this case, each of the exit temperatures and the exit humilities may be monitored and, if the state point goes beyond the allowable range from the controlling line ($J_{11}$–$J_{20}$) and does not return to the tolerable range even after the elapse of a predetermined period of time (for example, 2 min), an alarm may be blown.

As has been described above, according to the present invention, since an optimum controlling line is set automatically based on the outside air state point determined by the temperature/humidity of the outside air and a previously set aimed temperature/humidity line and, based thereon, adjusting devices to be used for temperature/humidity control are selected from the main heater, the adiabatic humidifier, the cooler and the auxiliary heater provided as the temperature/humidity adjusting devices to the air conditioner, and heating/humidifying/cooling capacity for each of the devices can be controlled independently of each other such that the exit temperature for each of the temperature/humidity adjusting devices is identical with the end point temperature for each of the main heating line, the adiabatic humidifying line, the cooling line and the auxiliary heating line of the previously set controlling line. Accordingly, the control amount for each of them can be set simply and accurately irrespective of other control amounts, as well as wasteful control operation can be avoided, so that it can provide excellent effects capable of providing fast response speed, minimizing the energy loss and, accordingly, saving the running cost.

Further, the controller according to the present invention can provide excellent effects, even when the design for the air conditioner is changed or the temperature/humidity adjusting devices are replaced, that an optimum temperature/humidity control can be conducted corresponding to the air conditioner put under different conditions by merely changing the data stored in the memory of the controller.

What is claimed is:

1. A temperature/humidity controller used for controlling temperature/humidity of an air conditioner (1) in which
at least one of temperature/humidity adjusting devices (4, 4, - - - ) including a main heater (H), an adiabatic humidifier (W), a cooler (C) and an auxiliary heater (RH) for controlling temperature/humidity of an intaken outside air are arranged in this order along an air flow path, and further comprising;
capacity controllers ($Y_1$–$Y_4$) each conducting feedback control for the capacity of each of the temperature/humidity adjusting devices (4, 4, - - - ) such that the exit temperature or the exit humidity of each of the temperature/humidity adjusting devices (4, 4, - - - ) is identical with the aimed exit temperature or aimed exit humidity, wherein
the temperature/humidity controller comprises a main controller (11) having a temperature/humidity sensor ($TH_1$) for detecting temperature/humidity of the outside air connected to the input thereof and the capacity controllers ($Y_1$–$Y_4$) connected to the output thereof, in which
the main controller (11) comprises:
a psychrometric chart table (13) previously storing a psychrometric chart,
an aimed temperature/humidity line setter (14) for setting, on the psychrometric chart table (13), an aimed temperature/humidity line (Lo) formed by connecting an upper state point (Ps) determined by an upper limit temperature and an upper limit humidity and a lower limit state point (Pw) determined by a lower limit temperature and a lower limit humidity of a conditioned air,
an outside air state point setter (16) for setting each of outside air state points ($G_1$–$G_5$) based on the temperature/humidity of an outside air detected by the temperature/humidity sensor ($TH_1$) on the psychrometric chart table (13),
a controlling line setter (18) for setting each of controlling lines ($J_1$–$J_5$) formed by sequentially connecting necessary lines selected from a main heating line ($H_L$) progressing along an equal absolute humidity line in the heating direction on the psychrometric chart, an adiabatic humidifying line ($W_L$) progressing along an equal enthalpy line in the humidifying direction on the psychrometric chart, a cooling line ($C_L$) progressing toward a cooling temperature (Tc) set lower than the dew point for the upper limit state point (Ps) on the psychrometric chart and an auxiliary heating line ($RH_L$) progressing along the equal absolute humidity line in the heating direction on the psychrometric chart in this order, from the outside air state point ($G_1$–$G_5$) to a point on the aimed temperature/humidity line (Lo), in accordance with the temperature/humidity adjusting device (4, 4, - - - ) provided to the air conditioner (1), and
an aimed exit temperature setter (20) for outputting the temperature for the end point of each of the main heating line ($H_L$), the adiabatic humidifying line ($W_L$), the cooling line ($C_L$) and the auxiliary heating line ($RH_L$) as the aimed exit temperature for each of the main heater (H), the adiabatic humidifier (W), the cooler (C) and the auxiliary heater (RH) provided to the air conditioner (1) in accordance with each of the controlling lines ($J_1$–$J_5$) set by the controlling line setter (18) to each of the capacity controllers ($Y_1$–$Y_4$).

2. A temperature/humidity controller for use in an air conditioner as defined in claim 1, wherein the controller comprises an abnormality detector (21) that informs the abnormality in each of the temperature/humidity adjusting devices (4, 4, - - - ) when a difference between the exit temperature of each of the temperature/humidity adjusting devices (4, 4, - - - ) detected by each of the temperature sensors ($T_1$–$T_4$) and the aimed exit temperature of each of the temperature/humidity adjusting devices (4, 4, - - - ) set by the aimed exit temperature setter (20) is larger than an allowable tolerance and is not reduced to less than the allowable tolerance even after the elapse of a predetermined period of time.

3. A temperature/humidity controller for use in an air conditioner as defined in claim 1, wherein the controller comprises:
a control area setter (15) for dividing the psychrometric chart in accordance with the aimed temperature/humidity line (Lo) set by the aimed temperature/humidity line setter (14) into at least four regions partitioned by:
an aimed temperature/humidity line (Lo) connecting an upper limit state point (Ps) and a lower limit state point (Pw),
an upper limit enthalpy line (Es) with enthalpy equal to that at the upper limit state point (Ps) and extending from the upper limit state point (Ps) to a higher temperature region, an upper limit absolute humidity line (Ls) with absolute humidity equal to that at the upper limit state point (Ps) and extending from the upper limit state point (Ps) toward a lower temperature region, a lower limit enthalpy line (Ew) with enthalpy equal to that at the lower limit state point (Pw) and extending from the lower limit state point (Pw) to the higher temperature region, and a lower limit absolute humidity line (Lw) with absolute humidity equal to that at the lower limit state point (Pw) and extending from the lower limit state point (Pw) to the lower temperature region, and setting each of the regions on the psychrometric chart table (13), and a control area judging device (17) for judging each of control areas ($A_1$–$A_5$) which includes each of outside air state points ($G_1$–$G_5$) set by the outside air state point setter (16), in which the controlling line setter (18) comprises a control process setter ($S_1$) for low temperature, a control process setter ($S_2$) for middle temperature/low humidity, a control process setter ($S_3$) for middle temperature/high humidity and a control process setter ($S_4$) for high temperature, each sensor previously storing data for the temperature/humidity adjusting devices to be used in accordance with each of the control areas ($A_1$–$A_5$) which includes the outside air state point ($G_1$–$G_5$), and control processes therefor such that;

the main heater (H) and the adiabatic humidifier (W) are set as the temperature/humidity adjusting device (4) to be used and a controlling line ($J_1$) formed by sequentially connecting the main heating line ($H_L$) progressing along the equal absolute humidity line in the heating direction on the psychrometric chart and the adiabatic humidifying line ($W_L$) progressing along the equal enthalpy line in the humidifying direction on the psychrometric chart from the outside air state point ($G_1$) to the lower limit state point (Pw) in this order is set as the control processes for the control process setter ($S_1$), the adiabatic humidifier (W) is set as the temperature/humidity adjusting device (4) to be used and the adiabatic humidifying line ($W_L$) progressing along the equal enthalpy line in the humidifying direction from the outside air state point ($G_2$) to the aimed temperature/humidity line (Lo) on the psychrometric chart is set as a controlling line ($J_2$) as the control process for the control process setter ($S_2$), and the auxiliary heater (RH) is set as the temperature/humidity adjusting device (4) to be used and the auxiliary heating line ($RH_L$) progressing along the equal absolute humidity line in the heating direction from the outside air state point ($G_3$) to the aimed temperature/humidity line (Lo) on the psychrometric chart is set as the controlling line ($J_3$) as the control process for the control process setter ($S_3$), and the adiabatic humidifier (W), the cooler (C) and the auxiliary heater (RH) are set as the temperature/humidity adjusting device (4) to be used, and a controlling line ($J_4$, $J_5$) formed by sequentially connecting necessary lines selected from the adiabatic humidifying line ($W_L$), the cooling line ($C_L$) progressing toward the cooling temperature (Tc) set to lower than the dew point for the upper limit state point (Ps) on the psychrometric chart, and the auxiliary heating line ($RH_L$) progressing along the equal absolute humidity line in the heating direction on the psychrometric chart in this order is set as the control process for the control process setter ($S_4$).

4. A temperature/humidity controller for use in an air conditioner for controlling temperature/humidity of an air conditioner (1) in which at least one of temperature/humidity adjusting devices (4, 4 - - - ) including a main heater (H), an adiabatic humidifier (W), a cooler (C), an auxiliary heater (RH) and an isothermal humidifier (DS) for controlling temperature/humidity of an intaken outside air are arranged in this order along an air flow path, and comprising;

capacity controllers ($Y_1$–$Y_5$) each conducting feedback control for the capacity of each of the temperature/humidity adjusting devices (4, 4, - - - ) such that the exit temperature or the exit humidity of each of the temperature/humidity adjusting devices (4, 4, - - - ) is identical with the aimed exit temperature or aimed exit humidity, wherein the temperature/humidity controller comprises a main controller (32) having a temperature/humidity sensor ($TH_1$) for detecting temperature/humidity of an outside air connected at the input thereof and the capacity controllers ($Y_1$–$Y_5$) connected at the output thereof, in which the main controller (32) comprises:

a CPU (33) for calculating an aimed exit temperature or an aimed exit humidity for each of the temperature/humidity adjusting devices (4, 4, - - - ) in accordance with an outside air state point when the temperature/humidity data of the outside air is inputted from the temperature/humidity sensor ($TH_1$) for detecting the temperature/humidity of the outside air in accordance with a predetermined program, and a memory (34) for storing the program to be executed by the CPU (33) and necessary data, in which the memory (34) comprises:

a control map (M) having a the psychrometric chart divided into a plurality of control areas ($A_{11}$–$A_{20}$) in which a combination of the temperature/humidity adjusting devices (4, 4, - - - ) to be used according to the temperature/humidity of the outside air is set based on the performance of the temperature/humidity adjusting devices (4, 4, - - - ) provided to the air conditioner (1) and the aimed temperature/humidity of the conditioned air to be controlled for temperature/humidity, a control area judging program (PA) for judging a control area ($A_{11}$–$A_{20}$) which includes an outside air state point ($G_{11}$–$G_{20}$) determined by the temperature/humidity of the outside air when the temperature/humidity of the outside air is inputted, a controlling line setting program (PJ) for setting each of controlling lines ($J_{11}$–$J_{20}$) formed by sequentially connecting necessary lines selected from a main heating line ($H_L$) progressing along the equal absolute humidity line in the heating direction on the psychrometric chart, an adiabatic humidifying line ($W_L$) progressing along the equal enthalpy in the humidifying direction on the psychrometric chart, a cooling line ($C_L$) progressing to the cooling temperature (Tc) of the cooler (C) on the psychrometric chart, an auxiliary heating line ($RH_L$) progressing along the equal absolute humidity line in the heating direction on the psychrometric chart and an isothermal humidifying line ($DS_L$) progressing along the isothermal line in the humidifying direction on the psychrometric chart in this order, in accordance with each of control areas ($A_{11}$–$A_{20}$) which includes each of outside air state points ($G_{11}$–$G_{20}$) and an aimed exit temperature/humidity setting program (PD) for outputting the end point temperature/humidity for each of the main heating line ($H_L$), the adiabatic humidifying line ($W_L$), the cooling line ($C_L$), the auxiliary heating line ($RH_L$) and the isothermal humidifying line ($DS_L$) as the aimed exit temperature or the aimed exit humidity for each of the main heater (H), the adiabatic humidifier (W), the cooler (C), the auxiliary heater (RH) and the isothermal humidifier (DS) provided to the air conditioner (1) based on each of the controlling lines ($J_{11}$–$J_{20}$) set by the controlling line setting program (PJ) to each of the capacity controllers ($Y_1$–$Y_5$).

5. A recording medium for recording a temperature/humidity control program for an air conditioner (1) in which at least one of temperature/humidity adjusting devices (4, 4, - - - ) including a main heater (1), an adiabatic humidifier (W), a cooler (C), an auxiliary heater (RH) and an isothermal humidifier (DS) for controlling temperature/humidity of an intaken outside air are disposed in this order along an air path, wherein the recording medium comprises:

a control map (M) comprising numerical data or formulated data formed by dividing a psychrometric chart into a plurality of control areas ($A_{11}$–$A_{20}$) for which a combination of temperature/humidity adjusting devices (4, 4, - - - ) to be used in accordance with the temperature/humidity of the outside air is set based on the performance of the temperature/humidity adjusting devices (4, 4, - - - ) provided to the air conditioner (1) and the aimed temperature/humidity of the conditioned air to be controlled for temperature/humidity by the air conditioner (1), a control area judging program (PA) for judging a control area ($A_{11}$–$A_{20}$) which includes an outside air state point ($G_{11}$–$D_{20}$) determined by the temperature/humidity of the outside air when the temperature/humidity of the outside air is inputted, a controlling line setting program (PJ) for setting each of controlling lines ($J_{11}$–$J_{20}$) formed by sequentially connecting necessary lines selected from a main heating line ($H_L$) progressing along the equal absolute humidity line in the heating direction on the psychrometric chart, an adiabatic humidifying line ($W_L$) progressing along the equal enthalpy line in the humidifying direction on the psychrometric chart, a cooling line ($C_L$) progressing toward the cooling temperature (Tc) of the cooler (C) on the psychrometric chart, an auxiliary heating line ($RH_L$) progressing along the equal absolute humidity line in the heating direction on the psychrometric chart, and an isothermal humidifying line ($DS_L$) progressing along the isothermal line in the humidifying direction on the psychrometric chart in this order, from each of outside air state points ($G_{11}$–$G_{20}$) to a state point of the aimed temperature/humidity of conditioned air for each of the control areas ($A_{11}$–$A_{20}$), and an aimed exit temperature/humidity setting program (PD) for calculating the temperature for the end point of each of the main heating line ($H_L$), the adiabatic humidifying line ($W_L$), the cooling line ($C_L$), the auxiliary heating line ($RH_L$), and the isothermal humidifying line ($DS_L$) as the aimed exit temperature or the aimed exit humidity for each of the main heater (H), the adiabatic humidifier (W), the cooler (C), the auxiliary heater (RH) and the isothermal humidifier (DS) based on each of the controlling lines ($J_{11}$–$J_{20}$) set by the controlling line setting program (PJ).

* * * * *